United States Patent
Nayeb Nazar et al.

(10) Patent No.: US 12,483,373 B2
(45) Date of Patent: Nov. 25, 2025

(54) METHODS, SYSTEMS, AND APPARATUS FOR TRANSMITTING UPLINK CONTROL INFORMATION

(71) Applicant: InterDigital Patent Holdings, Inc., Wilmington, DE (US)

(72) Inventors: Shahrokh Nayeb Nazar, San Diego, CA (US); Mahmoud Taherzadeh Boroujeni, San Diego, CA (US); Erdem Bala, East Meadow, NY (US); Alphan Sahin, Westbury, NY (US); Oghenekome Oteri, San Diego, CA (US); Rui Yang, Greenlawn, NY (US); Frank La Sita, Long Beach, NY (US); Ahmad Reza Hedayat, Aliso Viejo, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/338,879

(22) Filed: Jun. 21, 2023

(65) Prior Publication Data

US 2023/0336316 A1 Oct. 19, 2023

Related U.S. Application Data

(63) Continuation of application No. 16/610,222, filed as application No. PCT/US2018/030428 on May 1, 2018, now Pat. No. 11,736,259.
(Continued)

(51) Int. Cl.
*H04L 5/00* (2006.01)
*H04L 1/1607* (2023.01)
(Continued)

(52) U.S. Cl.
CPC .......... *H04L 5/0055* (2013.01); *H04L 1/1671* (2013.01); *H04W 72/0453* (2013.01); *H04W 72/21* (2023.01); *H04W 72/23* (2023.01)

(58) Field of Classification Search
CPC ... H04L 5/0055; H04L 1/1671; H04L 1/1692; H04L 1/1607; H04L 1/1812;
(Continued)

(56) References Cited

U.S. PATENT DOCUMENTS 8,533,553 B2 9/2013 Yang et al.
8,571,120 B2 10/2013 Muharemovic et al.
(Continued)

FOREIGN PATENT DOCUMENTS

CN 101796749 A 8/2010
CN 101854496 A 10/2010
(Continued)

OTHER PUBLICATIONS

3GPP TSG RAN WG1 Meeting #82bis, "Analysis of In-Band Operation", R1-155971, Oct. 5-9, 2015, 5 pages.
(Continued)

*Primary Examiner* — Kibrom T Hailu
(74) *Attorney, Agent, or Firm* — Flaster Greenberg, P.C.

(57) ABSTRACT

A wireless transmit receive unit (WTRU) may be configured to transmit uplink control information such as Hybrid Automatic Retransmission Request (HARQ) Acknowledgement or Negative Acknowledgement (ACK/NACK) using a sequence. The HARQ ACK/NACK may comprise one bit or two bits of information, and the WTRU may use a cyclic shift of the sequence to transmit the HARQ ACK/NACK. The WTRU may use different cyclic shifts of the sequence to transmit different HARQ ACK/NACK values and the cyclic shifts may be separated from each other in a manner to facilitate the transmissions. The WTRU may be further
(Continued)

configured to receive, from a physical downlink control channel (PDCCH), an indication of a resource block for transmitting the HARQ ACK/NACK.

20 Claims, 19 Drawing Sheets

Related U.S. Application Data

(60) Provisional application No. 62/564,755, filed on Sep. 28, 2017, provisional application No. 62/500,772, filed on May 3, 2017.

(51) Int. Cl.
  *H04W 72/0453* (2023.01)
  *H04W 72/21* (2023.01)
  *H04W 72/23* (2023.01)

(58) Field of Classification Search
  CPC ... H04L 1/1829; H04L 5/0053; H04L 5/0094; H04L 1/1858; H04L 1/1896; H04L 5/0037; H04W 72/0453; H04W 72/21; H04W 72/23
  See application file for complete search history.

(56) References Cited

U.S. PATENT DOCUMENTS

| | | | |
|---|---|---|---|
| 8,670,379 B2 | 3/2014 | Yamada et al. | |
| 8,976,660 B2 | 3/2015 | Kang et al. | |
| 9,504,037 B2 | 11/2016 | Yi et al. | |
| 9,554,374 B2 | 1/2017 | Han et al. | |
| 9,565,008 B2 | 2/2017 | Ko et al. | |
| 9,608,791 B2 | 3/2017 | Choi et al. | |
| 9,629,152 B2 | 4/2017 | Han et al. | |
| 9,742,545 B2 | 8/2017 | Kwon et al. | |
| 9,781,738 B2 | 10/2017 | Pietraski et al. | |
| 9,800,394 B2 | 10/2017 | Yang et al. | |
| 9,854,575 B2 | 12/2017 | Yang et al. | |
| 9,980,257 B2 | 5/2018 | Chen et al. | |
| 9,986,541 B2 | 5/2018 | Bala et al. | |
| 9,986,551 B2 | 5/2018 | Takeda et al. | |
| 10,342,005 B2 | 7/2019 | Song et al. | |
| 10,368,342 B2 | 7/2019 | Nayeb et al. | |
| 11,082,958 B2 | 8/2021 | Gao et al. | |
| 11,083,003 B2 | 8/2021 | Xiong et al. | |
| 2006/0026536 A1 | 2/2006 | Hotelling et al. | |
| 2007/0075184 A1 | 4/2007 | Marimon et al. | |
| 2008/0045141 A1 | 2/2008 | Suga | |
| 2008/0075184 A1 | 3/2008 | Muharemovic et al. | |
| 2010/0034312 A1* | 2/2010 | Muharemovic | H04B 7/0417 |
| | | | 375/267 |
| 2010/0142475 A1 | 6/2010 | Kim et al. | |
| 2010/0232382 A1 | 9/2010 | Gauvreau et al. | |
| 2010/0331037 A1 | 12/2010 | Jen | |
| 2011/0007674 A1 | 1/2011 | Dai et al. | |
| 2011/0116436 A1 | 5/2011 | Bachu et al. | |
| 2011/0116457 A1 | 5/2011 | Damnjanovic et al. | |
| 2011/0141941 A1 | 6/2011 | Lee et al. | |
| 2011/0142000 A1* | 6/2011 | Han | H04L 27/2602 |
| | | | 370/329 |
| 2011/0170489 A1 | 7/2011 | Han et al. | |
| 2011/0243066 A1 | 10/2011 | Nayeb Nazar et al. | |
| 2012/0188961 A1 | 7/2012 | Suzuki et al. | |
| 2012/0250742 A1 | 10/2012 | Tiirola et al. | |
| 2012/0281656 A1 | 11/2012 | Hooli et al. | |
| 2012/0294273 A1 | 11/2012 | Ahn et al. | |
| 2013/0039387 A1 | 2/2013 | Qu | |
| 2013/0044664 A1 | 2/2013 | Nory et al. | |
| 2013/0077569 A1 | 3/2013 | Nam et al. | |
| 2013/0083742 A1 | 4/2013 | Baldemair et al. | |
| 2013/0133657 A1 | 5/2013 | Berthon-Jones | |
| 2013/0142142 A1 | 6/2013 | McBeath et al. | |
| 2013/0176930 A1 | 7/2013 | Lee et al. | |
| 2013/0194931 A1 | 8/2013 | Lee et al. | |
| 2013/0258978 A1 | 10/2013 | Aiba et al. | |
| 2013/0288738 A1 | 10/2013 | Takeda et al. | |
| 2013/0301545 A1 | 11/2013 | Wang et al. | |
| 2013/0322376 A1 | 12/2013 | Marinier et al. | |
| 2014/0044090 A1 | 2/2014 | Beale | |
| 2014/0050130 A1 | 2/2014 | Kim et al. | |
| 2014/0071929 A1 | 3/2014 | Seo et al. | |
| 2014/0086197 A1 | 3/2014 | Yang et al. | |
| 2014/0092856 A1 | 4/2014 | Yang et al. | |
| 2014/0198733 A1 | 7/2014 | Yin et al. | |
| 2014/0269595 A1 | 9/2014 | Lee et al. | |
| 2014/0286281 A1 | 9/2014 | Jang et al. | |
| 2014/0293971 A1 | 10/2014 | Yoo et al. | |
| 2014/0301324 A1* | 10/2014 | Cheng | H04L 5/0055 |
| | | | 370/329 |
| 2014/0307569 A1 | 10/2014 | Barbieri et al. | |
| 2014/0307703 A1 | 10/2014 | Gaal et al. | |
| 2014/0362804 A1* | 12/2014 | Han | H04L 5/0053 |
| | | | 370/329 |
| 2015/0085718 A1 | 3/2015 | Chen et al. | |
| 2015/0085720 A1 | 3/2015 | Gaal et al. | |
| 2015/0117337 A1 | 4/2015 | Choi et al. | |
| 2015/0131605 A1 | 5/2015 | Nogami et al. | |
| 2015/0146588 A1 | 5/2015 | Park | |
| 2015/0189574 A1 | 7/2015 | Ng et al. | |
| 2015/0208415 A1 | 7/2015 | Xu et al. | |
| 2015/0215078 A1 | 7/2015 | Chen et al. | |
| 2015/0215085 A1 | 7/2015 | Xu et al. | |
| 2015/0256308 A1 | 9/2015 | Ma et al. | |
| 2015/0295681 A1 | 10/2015 | Liang et al. | |
| 2015/0358111 A1 | 12/2015 | Marinier et al. | |
| 2015/0358132 A1 | 12/2015 | Wallen et al. | |
| 2016/0095105 A1* | 3/2016 | Chen | H04L 1/1861 |
| | | | 370/329 |
| 2016/0105264 A1 | 4/2016 | Chen et al. | |
| 2016/0127097 A1 | 5/2016 | Chen et al. | |
| 2016/0164643 A1 | 6/2016 | Loehr et al. | |
| 2016/0174204 A1 | 6/2016 | Yang et al. | |
| 2016/0192254 A1 | 6/2016 | Hooli et al. | |
| 2016/0192376 A1 | 6/2016 | Lee et al. | |
| 2016/0242207 A1 | 8/2016 | Yasukawa et al. | |
| 2016/0249359 A1 | 8/2016 | Yamazaki et al. | |
| 2016/0359591 A1 | 12/2016 | Yellapantula et al. | |
| 2017/0013565 A1 | 1/2017 | Pelletier et al. | |
| 2017/0019864 A1 | 1/2017 | Hwang et al. | |
| 2017/0078058 A1 | 3/2017 | Marinier et al. | |
| 2017/0164335 A1 | 6/2017 | Yamamoto et al. | |
| 2017/0164350 A1 | 6/2017 | Sun et al. | |
| 2017/0251493 A1 | 8/2017 | Zhang | |
| 2017/0288962 A1 | 10/2017 | Yi et al. | |
| 2017/0290008 A1 | 10/2017 | Tooher et al. | |
| 2017/0303283 A1 | 10/2017 | Ng et al. | |
| 2018/0076917 A1 | 3/2018 | Pan et al. | |
| 2018/0213530 A1 | 7/2018 | Mochizuki et al. | |
| 2018/0316464 A1* | 11/2018 | Stern-Berkowitz | |
| | | | H04L 1/1657 |
| 2019/0007175 A1* | 1/2019 | Kwak | H04L 5/0053 |
| 2019/0140876 A1* | 5/2019 | Yoshimura | H04B 1/00 |
| 2019/0312669 A1 | 10/2019 | Kwak et al. | |
| 2019/0342135 A1 | 11/2019 | Kwak et al. | |
| 2020/0059924 A1* | 2/2020 | Matsumura | H04L 27/2607 |

FOREIGN PATENT DOCUMENTS

| | | |
|---|---|---|
| CN | 102187726 A | 9/2011 |
| CN | 102365837 A | 2/2012 |
| CN | 102577209 A | 7/2012 |
| CN | 103026650 A | 4/2013 |
| CN | 103178926 A | 6/2013 |
| CN | 103493417 A | 1/2014 |
| CN | 103548409 A | 1/2014 |
| CN | 104081709 A | 10/2014 |
| CN | 107563748 A | 1/2018 |
| EP | 2779774 A1 | 9/2014 |
| JP | 2013-527675 A | 6/2013 |
| JP | 2013-240069 A | 11/2013 |

(56) References Cited

FOREIGN PATENT DOCUMENTS

| | | |
|---|---|---|
| JP | 2014-096805 A | 5/2014 |
| JP | 2014/527344 A | 10/2014 |
| JP | 2014-534787 A | 12/2014 |
| JP | 2016/511988 A | 4/2016 |
| JP | 2017/022726 A | 1/2017 |
| JP | 6653384 B2 | 1/2020 |
| KR | 2010-0130138 A | 12/2010 |
| KR | 2011-0090784 A | 8/2011 |
| KR | 2011-0120807 A | 11/2011 |
| RU | 2518966 C1 | 6/2014 |
| TW | 2012/25573 A | 6/2012 |
| WO | WO 2006/062789 A2 | 6/2006 |
| WO | WO 2011/041623 A1 | 4/2011 |
| WO | WO 2013/051983 A1 | 4/2013 |
| WO | WO 2013/071486 A1 | 5/2013 |
| WO | 2014007493 A1 | 1/2014 |
| WO | WO 2014/049917 A1 | 4/2014 |
| WO | 2014165678 A2 | 10/2014 |
| WO | WO 2015/152589 A1 | 10/2015 |
| WO | WO 2017/026159 A1 | 2/2017 |

OTHER PUBLICATIONS

3GPP TSG-RAN #69 "NB LTE—Concept Description L1", RP-151397, Phoenix, Arizona, USA, Sep. 14-16, 2015, 24 pages.
CN 101854496 A, Cited in Information Disclosure Statement dated May 20, 2022, in U.S. Appl. No. 16/808,476. English translation of Description and Claims provided by Espacenet.com.
JP 2014-096805 A, Cited in Office Action dated Nov. 26, 2019, in related Japanese Patent Application No. 2018-522066.
CN 107563748 A, Cited in Office Action dated Jun. 3, 2021, in related Chinese Patent Application No. 201680063776.5.
3rd Generation Partnership Project (3GPP), Uplink Transmission of ACK/NAK Signals; Texas Instruments, R1-071488, 3GPP TSG RAN WG1 #48bis, St. Julian's, Malta, Mar. 26-30, 2007, 6 pages.
3rd Generation Partnership Project (3GPP), Data-Non-Associated Control Signal Transmission without UL Data, Nokia, Siemens, R1-071676, 3GPP TSG RAN WG1 Meeting #48bis, St. Julian's, Malta, Mar. 26-30, 2007, 6 pages.
3rd Generation Partnership Project (3GPP), Performance of ACK/NACK Signalling with CDM Multiplexing in LTE UL (FDD), Nokia, Siemens, R1-071677, 3GPP TSG RAN WG1 Meeting #48bis, St. Julian's, Malta, Mar. 26-30, 2007, 2 pages.
3rd Generation Partnership Project (3GPP), DTX Detection of ACK/NAK transmitted in Pusch, R1-082374, 3GPP TSG RAN WG1 Meeting #53bis, ZTE, Warsaw, Poland, Jun. 30-Jul. 4, 2008, 2 pages.
3rd Generation Partnership Project (3GPP), PHICH for Rel-13 Low Complexity UEs, R1-151338, CATT, 3GPP TSG RAN WG1 Meeting #80bis, Belgrade, Serbia, Apr. 20-24, 2015, 1 page.
3rd Generation Partnership Project (3GPP), HARQ-ACK Codebook Adaptation for CA Enhancement, R1-155538, Ericsson, 3GPP TSG RAN WG1 Meeting #82bis, Malmo, Sweden, Oct. 5-9, 2015, 4 pages.
3rd Generation Partnership Project (3GPP), R1-161928, Samsung, 3GPP TSG RAN WG1 NB-IoT Adhoc Meeting, Sophia Antipolis, France, Mar. 22-24, 2016, 3 pages.
3rd Generation Partnership Project (3GPP), sPUCCH Design for HAR1-ACK Feedback with Shortened TTI Length, R1-166860, LG Electronics, 3GPP TSG RAN WG1 Meeting#86, Gothenburg, Sweden, Aug. 22-26, 2016, 7 pages.
3rd Generation Partnership Project (3GPP), Performance Evaluation on Channel Structure of Short PUCCH for 1 or 2 bits UCI, R1-1704466, MediaTek Inc., 3GPP TSG RAN WG1 Meeting #88bis, Spokane, USA, Apr., 3-7, 2017, 7 pages.
3rd Generation Partnership Project(3GPP), Short PUCCH Formats for 1~2 UCI Bits, R1-1704750, Intel Corporation, 3GPP TSG RAN WG1 Meeting #88b, Spokane, USA, Apr., 03-07, 2017, 3 pages.
3rd Generation Partnership Project (3GPP), TS 36.211 V12.7.0, Technical Specification Group Radio Access Network, Evolved Universal Terrestrial Radio Access (E-UTRA), Physical Channels and Modulation (Release 12), Sep. 2015, 136 pages.
3rd Generation Partnership Project (3GPP), TS 36.212 V12.6.0, Technical Specification Group Radio Access Network, Evolved Universal Terrestrial Radio Access (E-UTRA), Multiplexing and Channel Coding (Release 12), Sep. 2015, 95 pages.
3rd Generation Partnership Project (3GPP), TS 36.321 V12.9.0, Technical Specification Group Radio Access Network, Evolved Universal Terrestrial Radio Access (E-UTRA), Medium Access Control (MAC) Protocol Specification (Release 12), Mar. 2016, 77 pages.
3rd Generation Partnership Project (3GPP), TS 36.331 V12.9.0, Technical Specification Group Radio Access Network, Evolved Universal Terrestrial Radio Access (E-UTRA), Radio Resource Control (RRC), Protocol Specification (Release 12), Mar. 2016, 456 pages.
3rd Generation Partnership Project (3GPP), TS 36.212 V12.0.0, Technical Specification Group Radio Access Network, Evolved Universal Terrestrial Radio Access (E-UTRA), Multiplexing and Channel Coding (Release 12), Dec. 2013, 88 pages.
3rd Generation Partnership Project (3GPP), TS 36.213 V12.1.0, Technical Specification Group Radio Access Network, Evolved Universal Terrestrial Radio Access (E-UTRA), Physical Layer Procedures (Release 12), Mar. 2014, 186 pages.
3rd Generation Partnership Project (3GPP), TS 36.213 V12.7.0, Technical Specification Group Radio Access Network, Evolved Universal Terrestrial Radio Access (E-UTRA), Physical Layer Procedures (Release 12), Sep. 2015, 241 pages.
3rd Generation Partnership Project (3GPP), TS 36.321 V12.7.0, Technical Specification Group Radio Access Network, Evolved Universal Terrestrial Radio Access (E-UTRA), Medium Access Control (MAC) Protocol Specification (Release 12), Sep. 2015, 77 pages.
3rd Generation Partnership Project (3GPP), TS 36.331 V12.7.0, Technical Specification Group Radio Access Network, Evolved Universal Terrestrial Radio Access (E-UTRA), Radio Resource Control (RRC), Protocol Specification (Release 12), Sep. 2015, 453 pages.
3rd Generation Partnership Project (3GPP), URLLC and eMBB frame structure and multiplexing, R1-1608957, 3GPP TSG-RAN WG1 Meeting #86bis, Lisbon, Portugal, Oct. 10-14, 2016, 7 pages.
3rd Generation Partnership Project (3GPP), Summary of [86-19] Discussion on Slot Structure Use Cases, R1-1610129, 3GPP TSG-RAN WG1 #86bis, Lisbon, Portugal, Oct. 10-14, 2016, 21 pages.
3rd Generation Partnership Project (3GPP), DL Control Channel Design, R1-1609128, 3GPP TSG RAN WG1 #86bis, Lisbon, Portugal, Oct. 10-14, 2016, 3 pages.
Third Generation Partnership Project (3GPP), "Physical Downlink Control Channel for MTC", Nokia Networks, Nokia Corporation, R1-150257, Feb. 9-13, 2015, 4 pages.
R1-1704373, "NR Short PUCCH Structure", ZTE, ZTE Microelectronics, Apr. 3-7, 2017, 12 pages.
R1-1704466, "Performance evaluation on channel structure of short PUCCH for 1 or 2 bits UCI", 3GPP TSG RAN WG1 Meeting #88bis; Spokane USA; MediaTek Inc., Apr. 3-7, 2017, 7 pages.
R1-1715522, "On Short PUCCH For Up To 2 Bits UCI", ZTE, Sanechips, Sep. 18-21, 2017, 8 pages.
R1-1904138, "Uplink Power Control Enhancement For NR URLLC", Ericsson, Apr. 8-12, 2019, 3 pages.
R1-2106667, "Enhancements On Multi-TRP For PDCCH, PUCCH And PUSCH", Lenovo, Motorola Mobility, Aug. 16-27, 2021, 17 pages.
R1-103306, "Way Forward on PDSCH Starting Position Indication With Cross-Carrier Scheduling", 3GPP TSG-RAN WG1 Meeting #61 Montreal, Canada,, May 10-14, 2010, 4 pages.
Hongsheng Ouyang, Zehua Gao Feng Gao, et al., "Comparative Analysis of Downlink Control Channel Capacity between TD-LTE and LTE FDD", Data Communications, No. 6, Dec. 28, 2013, 10 pages.
Min Chen, Anpeng Huang, et al., "Power synergy to enhance DCI reliability for OFDM-based mobile system optimization", Wangfang Foreign Language Conference Proceedings Database, Dec. 31, 2014, 1 page.

(56) References Cited

OTHER PUBLICATIONS

R1-1702811, "DMRS-based vs. Sequence-based PUCCH in short duration", NTT Docomo, Inc., 3GPP TSG RAN WG1 Meeting #88, Athens, Greece, Feb. 13-17, 2017, Feb. 2017, 9 pages.

* cited by examiner

FIG. 3

METHODS, SYSTEMS, AND APPARATUS FOR TRANSMITTING UPLINK CONTROL INFORMATION

CROSS-REFERENCE TO RELATED APPLICATIONS

This application is a continuation of U.S. patent application Ser. No. 16/610,222, filed Nov. 1, 2019, which is the National Stage entry under 35 U.S.C. § 371 of Patent Cooperation Treaty Application No. PCT/US2018/030428, filed May 1, 2018, which claims the benefit of Provisional U.S. Patent Application No. 62/564,755, filed Sep. 28, 2017, and Provisional U.S. Patent Application No. 62/500,772, filed May 3, 2017, the disclosures of which are incorporated herein by reference in their entireties.

BACKGROUND

Uplink control information may be transmitted in a Physical Uplink Control Channel (PUCCH). The PUCCH may be transmitted using a short or long duration. The UCI information may include a Scheduling Request (SR), which may be used to request radio resource.

SUMMARY

A wireless transmit receive unit (WTRU) may comprise a processor configured to transmit Hybrid Automatic Retransmission Request (HARQ) Acknowledgement or Negative Acknowledgement (ACK/NACK) using a sequence. The processor may be further configured to determine whether the HARQ ACK/NACK comprises one bit or two bits of information. If the determination is that the HARQ ACK/NACK comprises one bit of information, the processor may be configured to transmit the HARQ ACK/NACK using one of a first cyclic shift of the sequence or a second cyclic shift of the sequence. The first cyclic shift may correspond to a first one-bit HARQ ACK/NACK value and the second cyclic shift may correspond to a second one-bit HARQ ACK/NACK value. The first and second cyclic shifts may differ from each other by a half of a length of the sequence (e.g., by a half of the total number of cyclic shifts associated with sequence).

If the determination is that the HARQ ACK/NACK comprises two bits of information, the processor of the WTRU may be configured to transmit the HARQ ACK/NACK using one of four cyclic shifts of the sequence. Each of the four cyclic shifts may correspond to a respective two-bit HARQ ACK/NACK value, and the four cyclic shifts may differ from each other by at least a quarter of a length of the sequence (e.g., by a quarter of the total number of cyclic shifts associated with the sequence).

The sequence described herein may have a length of 12 (e.g., there may be 12 cyclic shifts associated with the sequence). In examples (e.g., when the HARQ ACK/NACK comprises one bit of information), the WTRU may use a first cyclic shift of 3 to transmit a first one-bit HARQ ACK/NACK value and may use a second cyclic shift of 9 to transmit a second one-bit HARQ ACK/NACK value. In examples (e.g., when the HARQ ACK/NACK comprises two bits of information), the WTRU may use cyclic shifts 1, 4, 7, and 10 to respectively transmit two-bit HARQ ACK/NACK values of (0,0), (0,1), (1,0), or (1,1), where the four cyclic shifts may different from each other by a quarter of the length of the sequence.

The WTRU may receive a configuration from a network entity and determine, based on the configuration, which cyclic shift of the sequence should be used to transmit the HARQ ACK/NACK. The WTRU may receive, from a physical downlink control channel (PDCCH), an indication of a resource block for transmitting the HARQ ACK/NACK. The WTRU may transmit a positive scheduling request (SR) with the HARQ ACK/NACK.

BRIEF DESCRIPTION OF THE DRAWINGS

A more detailed understanding may be had from the following description, given by way of example in conjunction with the accompanying drawings.

FIG. 3 is a diagram illustrating 1-bit ACK/NACK and/or SR transmission using two cyclic shifts of a sequence.

DETAILED DESCRIPTION

A detailed description of illustrative embodiments will now be described with reference to the various figures.

Although this description provides a detailed example of possible implementations, it should be noted that the details are intended to be exemplary and in no way limit the scope of the application.

Figure 1A:
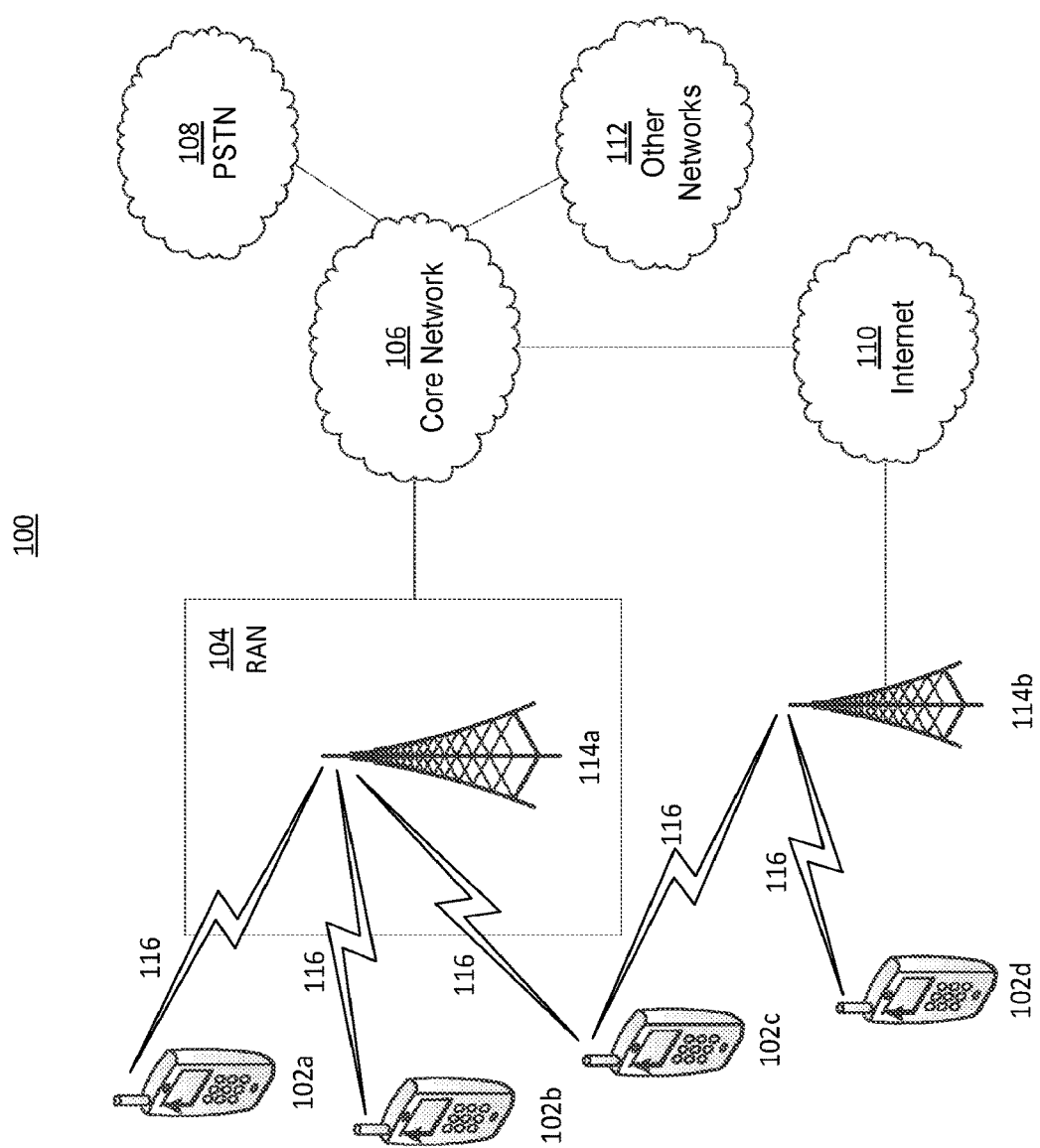
FIG. 1A is a system diagram illustrating an example communications system in which one or more disclosed examples may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
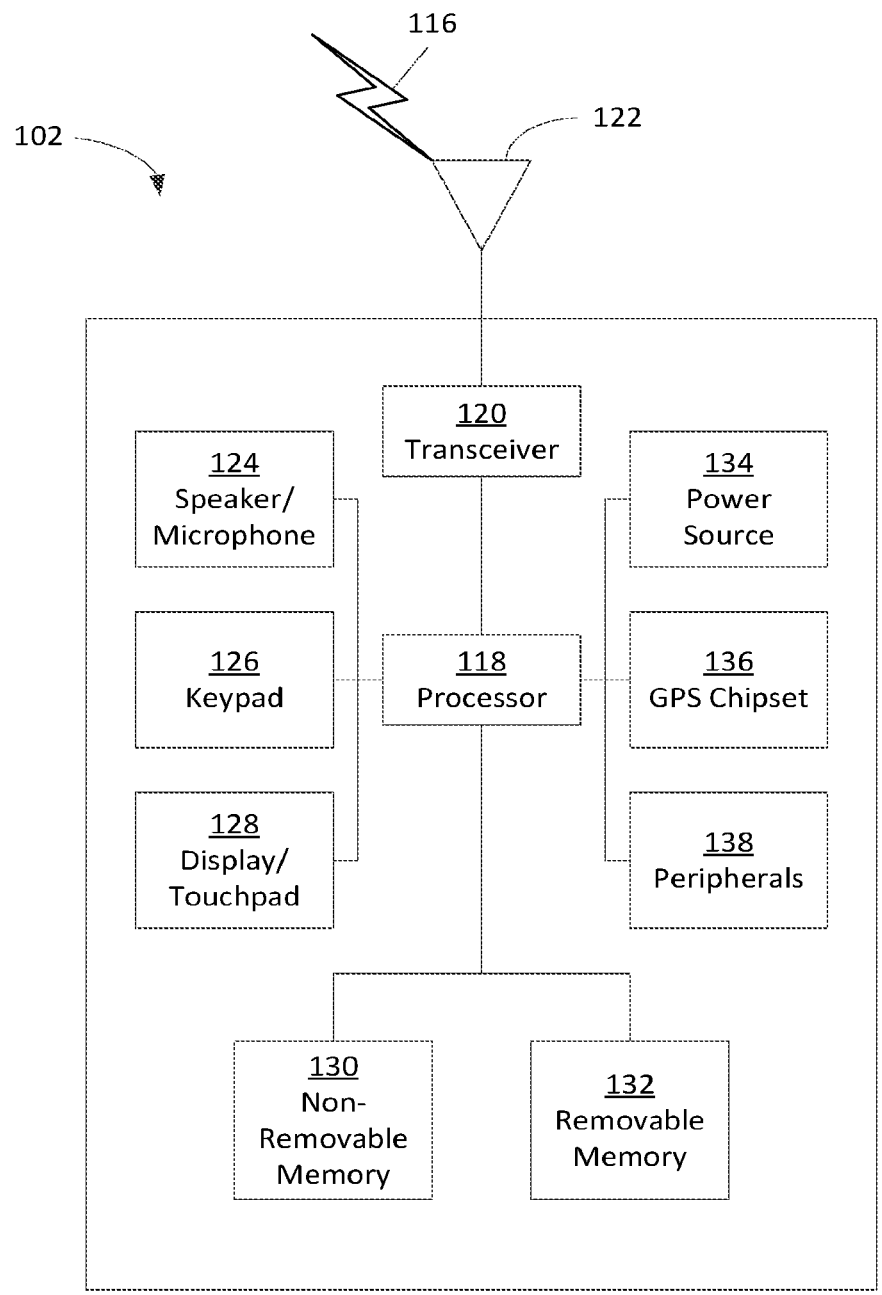
FIG. 1B is a system diagram illustrating an example wireless transmit/receive unit (WTRU) that may be used within the communications system illustrated in FIG. 1A according to an example.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
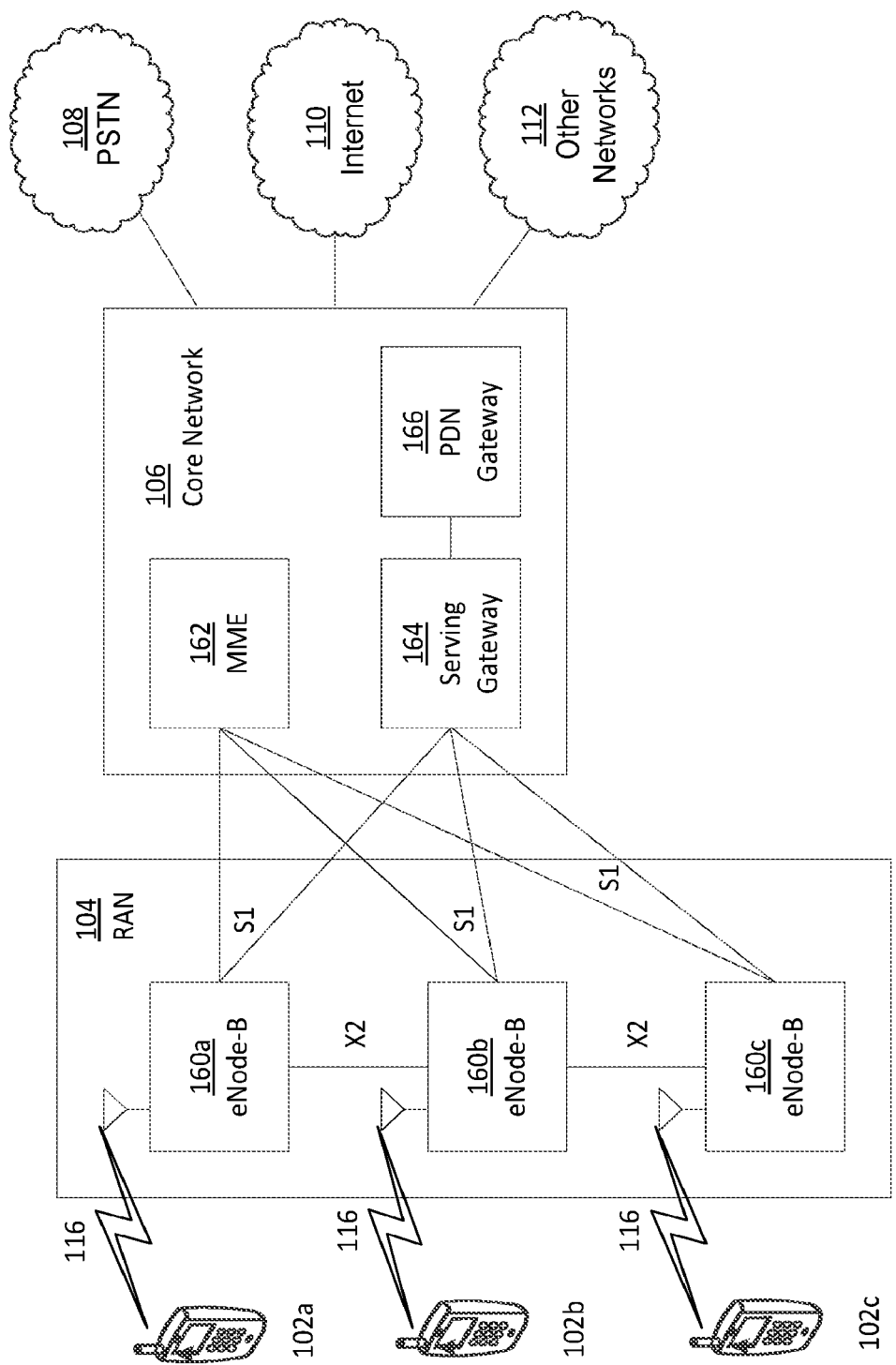
FIG. 1C is a system diagram illustrating an example radio access network (RAN) and an example core network (CN) that may be used within the communications system illustrated in FIG. 1A according to an example.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
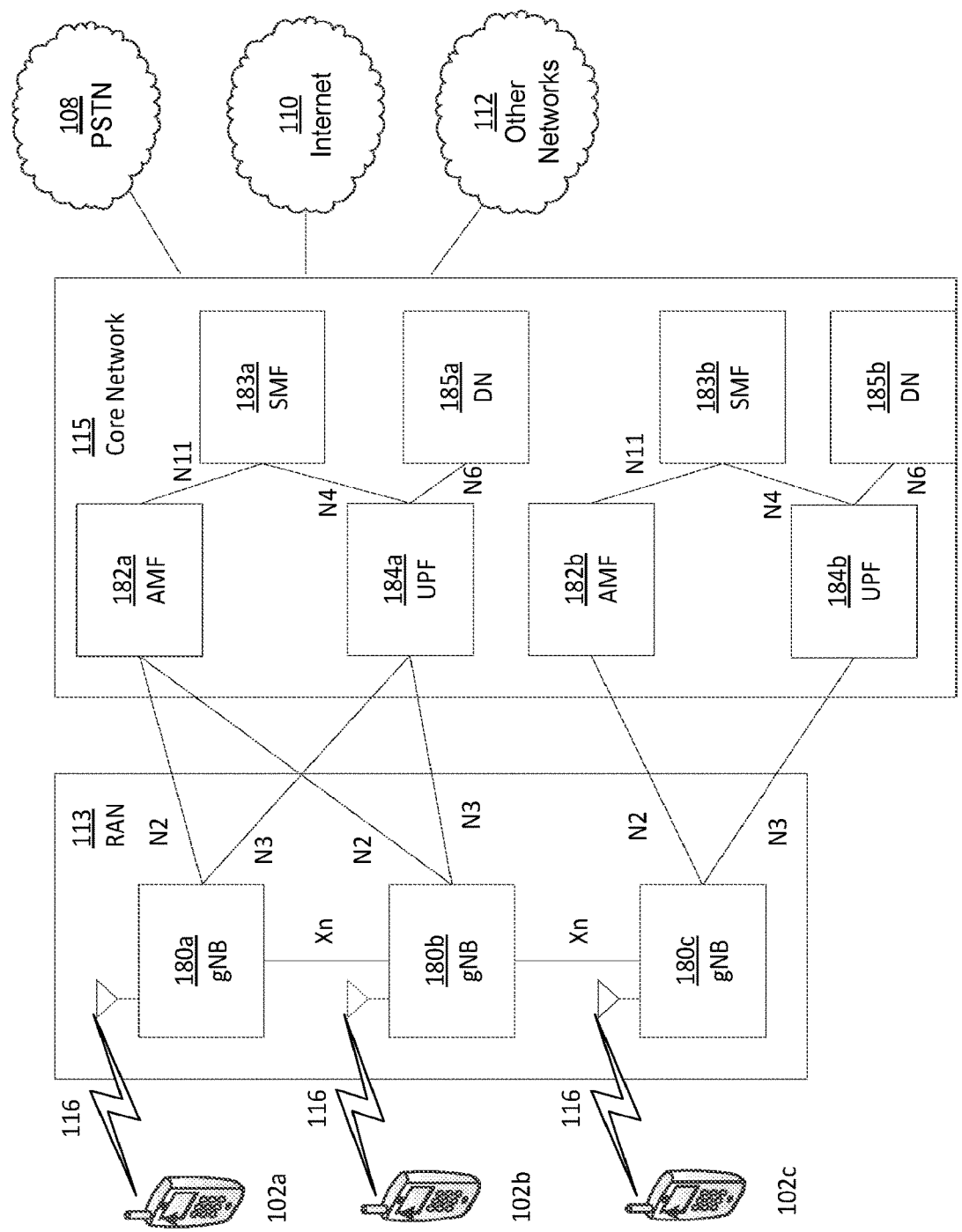
FIG. 1D is a system diagram illustrating a further example RAN and a further example CN that may be used within the communications system illustrated in FIG. 1A according to an example.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Methods, apparatus, and systems may be provided for scheduling a transmission (e.g., a request) in an uplink. A sequence may be determined (e.g., to perform the transmission). A cyclic shift of the sequence may be determined for a wireless transmit/receive unit (WTRU). A positive/negative acknowledgement (ACK/NACK) may be signaled, e.g., via a physical uplink control channel (PUCCH) and/or using the cyclic shift.

In wireless communication systems, Uplink Control Information (UCI) may comprise control and/or status information indicators that may facilitate transmission procedures at a physical layer. For example, a UCI may contain a Hybrid Automatic Retransmission Request (HARQ) Acknowledgement or Negative Acknowledgement (ACK/NACK) that may be used to indicate whether a HARQ was received. UCI may include a Channel Quality Indicator (CQI), which may serve as a measurement of a communication quality of a wireless channel. The CQI for a given channel may depend on the type of modulation scheme used by the communications system.

UCI may include a Scheduling Requests (SR) which may serve to request radio transmission resources for an upcoming downlink or uplink transmission. UCI may comprise a Precoding Matrix Indicator (PMI) and/or Rank Indicator (RI) for downlink or uplink transmission. The PMI may be used to facilitate communication over multiple data streams and signal interpretation at the physical layer, for example, by indicating a designated precoding matrix. An RI may indicate the number of layers that may be used for spatial multiplexing in the communication system, or the RI may indicate a maximum number of such layers. A wireless transmit/receive unit (WTRU), which may be a User Equipment (WTRU), may transmit UCI to a network (e.g., a network entity such as a base station) to provide the physical layer with information that facilitates wireless communication.

In New Radio (NR), UCI may be transmitted in Physical UL control channel (PUCCH). The PUCCH may be transmitted in a short duration (e.g. one or two OFDM symbols) around the last transmitted UL symbol(s) of a slot. The PUCCH may be transmitted in a long duration over multiple UL symbols (e.g., more than two OFDM symbols), which may improve coverage. UL control channel may be frequency-division-multiplexed with UL data channel within a slot. The WTRU may be assigned a PUCCH resource for UCI transmission where a PUCCH resource may include a time, frequency and, when applicable, a code domains.

In NR, a mechanism for efficient UL control information transmission in a PUCCH (e.g., a short PUCCH with a duration of one or two symbols) may be provided. Efficient UL control information transmission may involve a trade-off between user multiplexing capacity and block error ratio (BLER) performance. Methods and apparatus may be provided to multiplex different categories of UCI (e.g., SR, ACK/NACK, etc.) and/or reference symbols or reference signals (RS) when there are multiple (e.g., two) lengths for the PUCCH (e.g., short PUCCH with a duration of one symbol or two symbols). In the case of SR transmission interference may be avoided while increasing a user multiplexing capacity.

PUCCH is a Physical Uplink Control Channel that may carry hybrid-ARQ acknowledgement (HARQ ACK) or negative acknowledgment (HARQ NACK), Channel State Information (CSI) reports (e.g., which may include beamforming information), and/or scheduling requests (SR). An Uplink Control Resource Set (UCRS) may include one or more Physical Resource Blocks (PRBs) in a frequency domain and may span over one or more orthogonal frequency-division multiplexing (OFDM) symbols in a time domain. PUCCH may be transmitted over one or multiple UCRS(s). Uplink Control Information (UCI) may include a set of control information bits transmitted by a WTRU to the gNB in the uplink.

A Constant Amplitude Zero Auto Correlation (CAZAC) sequence may be a periodic complex-valued sequence with constant amplitude and zero out-of-phase periodic (cyclic) autocorrelations. Pulse-position modulation (PPM) may be a form of encoding in which message bits may be encoded by the positions of transmitted pulse. Peak-to-Average Power Ratio (PAPR) may be the peak amplitude squared divided by the average power or the peak power divided by the average power.

ACK/NACK (e.g., HARQ ACK/NACK) and/or SR transmission on PUCCH (e.g., short PUCCH with a duration of one or two symbols) may be provided. Sequence-based PUCCH (e.g., short PUCCH) may be provided (e.g., UCI may be transmitted over the PUCCH using a sequence). For uplink control transmissions, a WTRU may transmit uplink control information (UCI) in the PUCCH with a certain duration (e.g., a short duration of one or two symbols). A WTRU may modulate a UCI information symbol, such as an ACK/NACK, an SR, or the like, with a sequence. The sequence may be a Zadoff-CHU (ZC) sequence, a CAZAC sequence, and/or the like (e.g., another suitable computer-generated sequence or CGS). The UCI information symbol may include a 1-bit BPSK or 2-bit QPSK symbol. Different cyclic shifts (e.g., cyclic time shifts) of the sequence (e.g., a CAZAC sequence) may be used for signaling (e.g., transmitting) the UCI (e.g., 1 bit or 2 bits of UCI information). Examples of these scenarios are disclosed herein.

Figure 2:
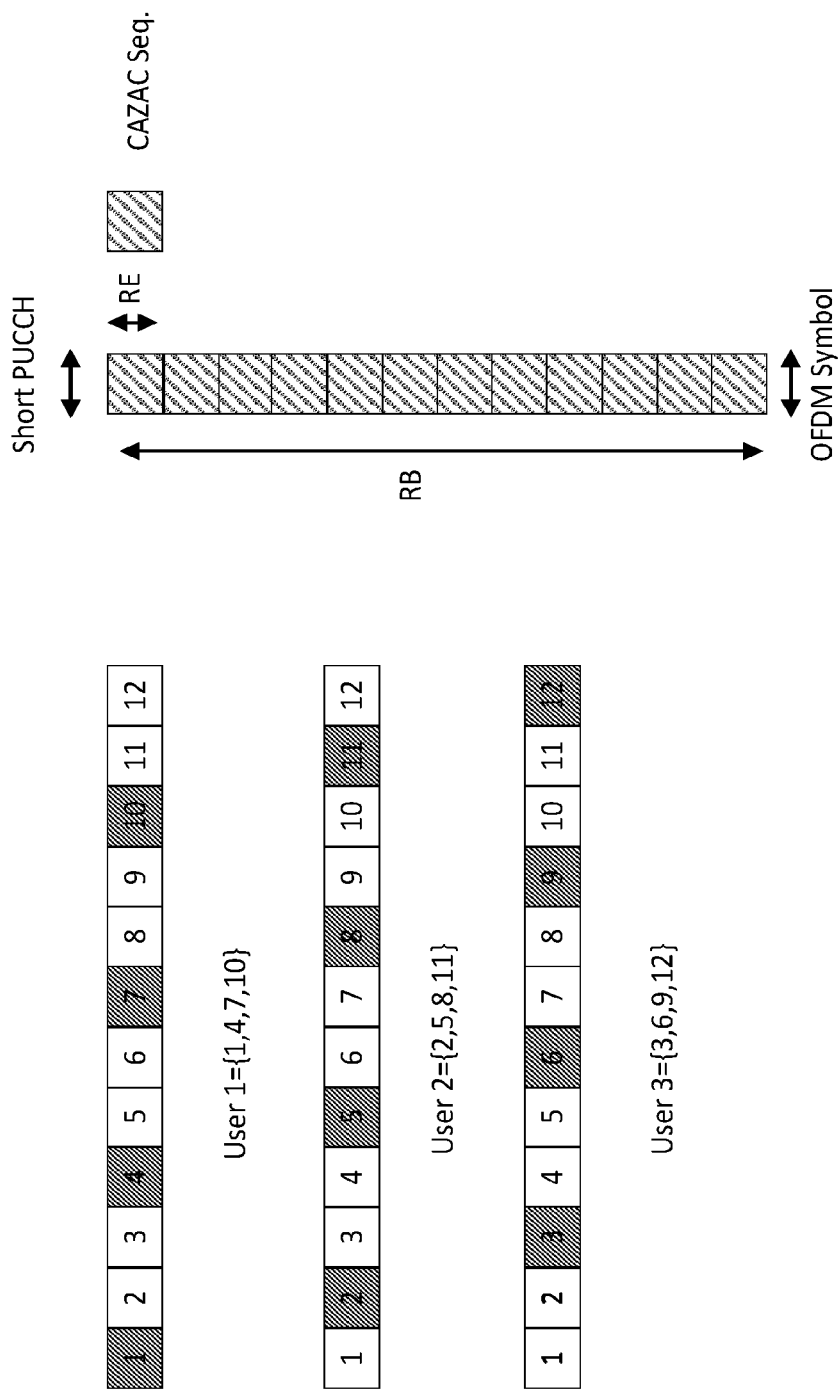
FIG. 2 is a diagram illustrating 2-bit HARQ ACK/NACK and/or scheduling request (SR) transmission using four cyclic shifts of a sequence.

FIG. 2 shows an example diagram of using four cyclic shifts of a sequence (e.g., a CAZAC sequence) to signal 2 bits of positive/negative acknowledgements (e.g., HARQ ACK/NACK) or 1-bit of ACK/NACK and 1-bit of SR. For example, FIG. 2 may show how a WTRU may employ four cyclic shifts of the same base CAZAC sequence to signal 2 bits of positive/negative acknowledgements (e.g., HARQ ACK/NACK) or 1-bit of ACK/NACK and 1-bit of SR, as shown in Table 1. As shown in FIG. 2, there may be 12 possible cyclic shifts (e.g., based on a length-12 sequence). The cyclic shifts may be configured for different WTRUs which may be multiplexed on the same time-frequency PUCCH (e.g., short PUCCH) resources. The different sequences may be separable at the receiver in the presence of frequency selective channels, e.g., by spacing the cyclic shifts that may be allocated to the same user apart from each other (e.g., the furthest apart from each other). For example, cyclic shifts that may have a large circular separation (e.g., the largest possible circular separation) may be assigned to the same user. This may improve error rate for the ACK/NACK detection for a user, for example. Where multiple SR bits may be transmitted, multiple ACK/NACK bits may be applied to multiple SR bits.

TABLE 1

Example cyclic shift with circular separation, which may be a largest circular separation, for 2-bit HARQ ACK/NACK and/or SR transmission

|  | Cyclic Shift = 1 | Cyclic Shift = 4 | Cyclic Shift = 7 | Cyclic Shift = 10 |
|---|---|---|---|---|
| 2-bit ACK/NACK | A/N = [0 0] | A/N = [1 0] | A/N = [1 1] | A/N = [0 1] |
| 1-bit ACK/NACK and 1-bit SR | NACK = 0 SR = 0 | ACK = 1 SR = 0 | ACK = 1 SR = 1 | NACK = 0 SR = 1 |

As shown in Table 1, a WTRU may determine that it has a two-bit HARQ ACK/NACK or a one-bit HARQ ACK/NACK and a one-bit SR to transmit. The WTRU may further determine that a sequence that may be used to transmit the HARQ ACK/NACK and/or the SR has a length of 12 (e.g., there may be a total of 12 cyclic shifts available to the WTRU for transmitting the HARQ ACK/NACK and/or the SR). The WTRU may select different cyclic shifts of the sequence to transmit the HARQ ACK/NACK and/or the SR based on the value of the HARQ ACK/NACK and/or the SR. The WTRU may select the cyclic shifts such that they differ from each other to the largest extent possible (e.g., by at least a quarter of the length of the sequence or a quarter of the total number of cyclic shifts associated with the sequence). For example, when the sequence has a length of 12, the WTRU may use cyclic shifts 1, 4, 7, and 10 to transmit two-bit HARQ ACK/NACK values of [0,0], [1,0], [1,1], and [0,1], respectively. The WTRU may receive a configuration from a network entity regarding which cyclic shift should be used to transmit the HARQ ACK/NACK and/or the SR. Different WTRUs may use different cyclic shifts to transmit HARQ ACK/ACK, e.g., to reduce the possibility of interference among the WTRUs. For example, a first WTRU may be configured to use cyclic shifts (1, 4, 7, 10) to transmit respectively transmit four two-bit HARQ NACK/ACK values while a second WTRU may be configured to use cyclic shifts (2, 5, 8, 11) to transmit the four two-bit HARQ NACK/ACK values. In examples (e.g., when a common sequence of length 12 is used), three WTRUs (e.g., users) may be multiplexed on the same time-frequency PUCCH resources.

Figure 3:
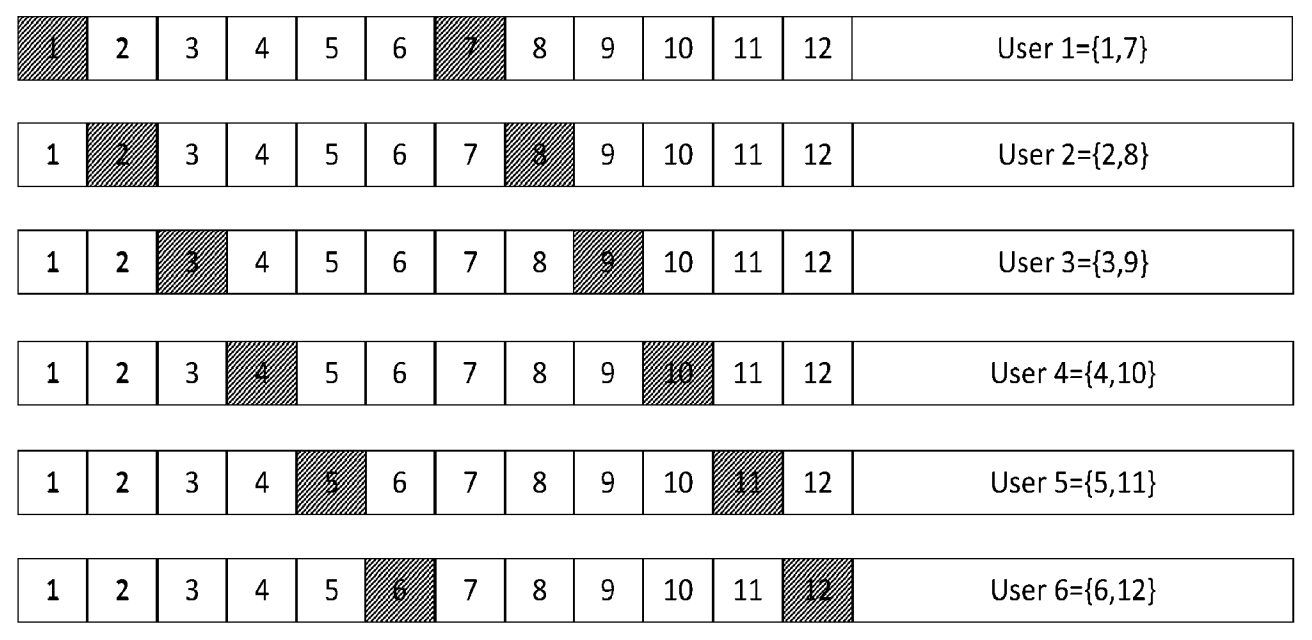

FIG. 3 is an example diagram illustrating 1-bit ACK/NACK and/or SR transmission using two cyclic shifts of a sequence. For example, as shown in FIG. 3, a WTRU may employ two cyclic shifts of a CAZAC sequence to signal 1-bit of positive/negative acknowledgements (e.g., HARQ ACK/NACK) or SR, as shown in Table 2A. Cyclic shifts with a large circular separation may be used for a user, for example to increase the probability of detection at the receiver. For example, cyclic shifts with the largest possible circular separation may be used for the same user to maximize the probability of detection at the receiver. When the HARQ ACK/NACK comprises one bit of information, two cyclic shifts of a sequence may be separated by half the length of the sequence (e.g., by half the total number of available cyclic shifts within the allocation RB(s) that may comprise a PUCCH). If 12 cyclic shifts are available within a PRB, up to six users may be supported in a PUCCH (e.g., short PUCCH) spanning 1 PRB. Up to 12 users may be supported in a PUCCH (e.g., short PUCCH) spanning 2 PRBs. NACK may be interpreted as DTX when there may not be DTX signaling.

TABLE 2A

Example cyclic shifts that may be mapped to one-bit SR and/or ACK/NACK/DTX

|  | Cyclic Shift = {1, 2, 3, 4, 5, 6} | Cyclic Shift = {7, 8, 9, 10, 11, 12} |
|---|---|---|
| 1-bit SR | SR = 0 | SR = 1 |
| 1-bit ACK/NACK/DTX | NACK/DTX | ACK |

As shown in Table 2A, a WTRU may determine that it has a one-bit HARQ ACK/NACK or a one-bit SR to transmit. The WTRU may further determine that a sequence that may be used to transmit the HARQ ACK/NACK and/or the SR has a length of 12 (e.g., there may be a total of 12 cyclic shifts associated with the sequence). The WTRU may select different cyclic shifts to transmit the HARQ ACK/NACK and/or the SR based on the value of the HARQ ACK/NACK and/or the SR. The WTRU may select the cyclic shifts such that they differ from each other to the largest extent possible (e.g., by a half of the length of the sequence or a half of the total number of cyclic shifts associated with the sequence). For example, when there are 12 cyclic shifts available, the WTRU may use cyclic shifts 1 and 7, 2 and 8, 3 and 9, and/or the like, to transmit HARQ NACK and HARQ ACK, respectively. The WTRU may receive a configuration from a network entity regarding which cyclic shift should be used to transmit the HARQ ACK/NACK and/or the SR. Different WTRUs may use different cyclic shifts to transmit HARQ ACK/ACK, e.g., to reduce the possibility of interference among the WTRUs. For example, a first WTRU may be configured to use cyclic shifts (1,7) to respectively transmit two one-bit HARQ NACK/ACK values while a second WTRU may be configured to use cyclic shifts (2,8) to transmit the two one-bit HARQ NACK/ACK values. In examples (e.g., when a common sequence of length 12 is used), six WTRUs (e.g., users) may be multiplexed on the same time-frequency PUCCH resources.

For SR transmission, the WTRU may transmit the request for an UL assignment using a cyclic shift of a sequence and may refrain from transmitting (e.g., transmit nothing) on its assigned sequence when it does not request an UL assignment. By refraining from transmission (e.g., not transmitting anything) in the absence of a request for UL scheduling, the WTRU may avoid causing interference for other users in the system. This approach may increase the number of users that may be multiplexed on a RB for SR transmission on PUCCH (e.g., short PUCCH). For example, depending on the frequency selectivity of the channel, 12 users may be multiplexed.

If an uplink channel (e.g., PUCCH) is highly frequency selective, the scheduler may avoid assigning adjacent cyclic shifts to different users. For example, in the scenario described in FIG. 3, odd cyclic shifts may be assigned and even cyclic shifts may not be used, or vice versa. The number of users that may be multiplexed on the same time-frequency PUCCH resources may be reduced by half.

The number of HARQ ACK/NACK and/or SR resources corresponding to cyclic shifts that may be supported in a PUCCH (e.g., short PUCCH) may be denoted as $N_{PUCCH}^{Short}$. Depending on the frequency selectivity of the channel, some of the cyclic shifts may be excluded from the pool of resources, e.g., using a subset restriction that may be realized by a parameter $\Delta_{shift}^{PUCCH} \in \{1,2,3\}$. Then, $$N_{PUCCH}^{Short} = 12 N_{RB}^{PUCCH} / \Delta_{shift}^{PUCCH}$$

where $N_{RB}^{PUCCH}$ may be a number of RBs that may comprise the PUCCH.

In the example shown in FIG. 3, $N_{RB}^{PUCCH}$ and $\Delta_{shift}^{PUCCH}$ may be equal to 1, which may result in $N_{PUCCH}^{Short} = 12$. $\Delta_{shift}^{PUCCH} = 1$ may imply that cyclic shifts may be used in the system and there may not be a subset restriction.

The WTRU may derive the resources (e.g., cyclic time shifts of a sequence) over which it may transmit ACK/NACK and/or SR from a received PUCCH parameter (e.g., a Short PUCCH index such as $n_{PUCCH}^{Short}$). The PUCCH parameter may be received from a higher layer (e.g., from a network entity) or as part of downlink control information (e.g., in the NR-PDCCH). This resource index may indicate at least one of (e.g., both of) a PUCCH region across the bandwidth or the cyclic shifts that may be allocated to the WTRU for UL signaling. The PUCCH region may be comprised of an allocation for PUCCH transmission, such as a minimum allocation for PUCCH transmission in terms of number of RBs. The WTRU may derive the PUCCH region $X_m$ used for UL signaling as a set of RBs with indices:

$$N_{RB} + m \left\lfloor \frac{n_{PUCCH}^{Short}}{N_{PUCCH}^{Short}} \right\rfloor, N_{RB} + m \left\lfloor \frac{n_{PUCCH}^{Short}}{N_{PUCCH}^{Short}} \right\rfloor + 1,$$
$$\ldots, N_{RB} + (m+1) \left\lfloor \frac{n_{PUCCH}^{Short}}{N_{PUCCH}^{Short}} \right\rfloor - 1$$

where m may represent an index to the PUCCH region within the overall PUCCH resource pool and may be derived as shown below.

$$m = \left\lfloor \frac{n_{PUCCH}^{Short}}{N_{PUCCH}^{Short}} \right\rfloor + N_{RB}$$

where $N_{RB}$ may be the RB index from which the PUCCH regions starts.

Figure 4A:
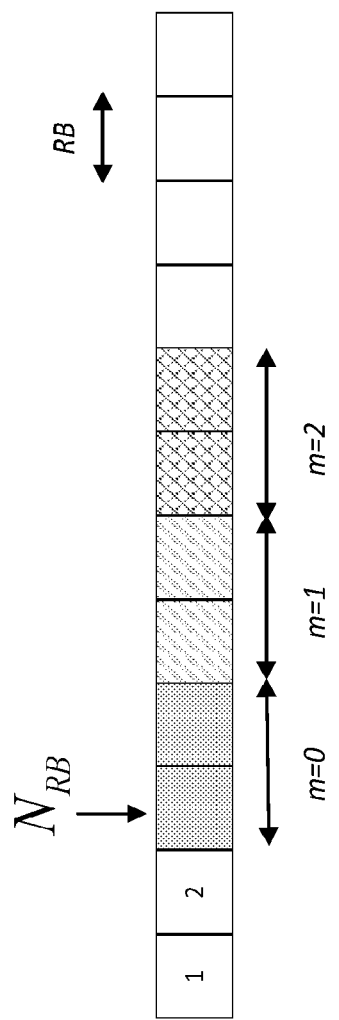
FIG. 4A is a diagram illustrating example PUCCH regions.

FIG. 4A is a diagram that may show example regions for PUCCH (e.g., a short PUCCH with a duration of one or two symbols) for different values of m. For example, FIG. 4A may show three PUCCH regions that may span 2 RBs. In examples (e.g., where multiple PUCCHs may be time division multiplexed (TDM) in a slot), the WTRU may derive the allocated PUCCH region in the time domain in terms of a set of OFDM symbol indices within the slot in addition to deriving the PUCCH region in the frequency domain in terms of a set of RB indices.

A WTRU may derive the assigned combination of the two cyclic shifts for 1-bit ACK/NACK/DTX and/or SR transmission within the PUCCH region $X_m$ that it may have identified according to:

$$n_{cs}^{(1)} = n_{PUCCH}^{Short} \bmod \frac{N_{PUCCH}^{Short}}{2}$$

$$n_{cs}^{(2)} = \left( n_{PUCCH}^{Short} \bmod \frac{N_{PUCCH}^{Short}}{2} \right) + \frac{N_{PUCCH}^{Short}}{2}$$

In 2-bit UCI signaling, the WTRU may derive the assigned combination of the four cyclic shifts for 2-bit ACK/NACK and/or SR transmission within the PUCCH region $X_m$ that it may have identified according to:

$$n_{cs}^{(1)} = n_{PUCCH}^{Short} \bmod \frac{N_{PUCCH}^{Short}}{4}$$

$$n_{cs}^{(2)} = \left( n_{PUCCH}^{Short} \bmod \frac{N_{PUCCH}^{Short}}{4} \right) + \frac{N_{PUCCH}^{Short}}{4}$$

$$n_{cs}^{(3)} = \left( n_{PUCCH}^{Short} \bmod \frac{N_{PUCCH}^{Short}}{4} \right) + \frac{N_{PUCCH}^{Short}}{2}$$

$$n_{cs}^{(4)} = \left( n_{PUCCH}^{Short} \bmod \frac{N_{PUCCH}^{Short}}{4} \right) + \frac{3 N_{PUCCH}^{Short}}{4}$$

In assigning PUCCH parameters (e.g., index $n_{PUCCH}^{Short}$) to the WTRU, a network (e.g., a gNB) may make sure that the resulting set of cyclic shifts may not overlap a set that may be assigned to another WTRU.

ACK/NACK/SR multiplexing on PUCCH (e.g., short PUCCH with one-symbol duration) may be used. A WTRU may send positive/negative HARQ acknowledgements (e.g., HARQ-ACK or HARQ-NACK) and/or a scheduling request (SR) in a preconfigured PUCCH resource (e.g., a short PUCCH). Determining how to send HARQ acknowledgements may consider how efficiently and robustly to assign cyclic shifts of a base sequence to HARQ-ACK, HARQ-NACK and/or SR. ACK/NACK is used herein for ease of notation to include HARQ-ACK/HARQ-NACK except where noted otherwise or indicated from the context. SR, positive SR, and SR=1 are used interchangeably. No SR, negative SR, and SR=0 are used interchangeably.

A WTRU may employ two cyclic shifts of a base computer generated sequence (CGS) to indicate ACK/NACK on a first configured (e.g., preconfigured) RB (e.g., when the WTRU does not have a scheduling request). A WTRU may employ one cyclic shift of a base CGS on a second configured RB (e.g., only) when the WTRU has a scheduling request. For instance, a WTRU, from a first set of WTRUs, may employ a pair of cyclic shifts of a base CGS on a first RB to send ACK/NACK, and a WTRU from a second set of WTRUs may employ a pair of cyclic shifts of the same or different base CGS on a second RB for sending ACK/NACK. A WTRU from the first or second set of WTRUs may employ a cyclic shift of the same or different base CGS on a third RB if (e.g., only if) the WTRU has a scheduling request. If the WTRU does not have a scheduling request, the WTRU may not be allowed to transmit (e.g., the WTRU may not be allowed to send anything) on the third RB and/or may increase its transmit power (e.g., by 3 dB) on the first or second RB (e.g., such that its total transmit power is less than or equal to the situation where the WTRU transmits its associated cyclic shift sequence on the first (or second RB) and the third RB).

SR indications may be provided implicitly, in which case a WTRU may employ two cyclic shifts of a base CGS (e.g., to indicate ACK/NACK on one of two configured RBs). The RB that the WTRU uses to place the sequences could be one of two configured RBs. For example, if the first RB is used, the WTRU may indicate that there is no scheduling request (e.g., SR=0), and if the second RB is used, the WTRU may indicate that it has a scheduling request (e.g., SR=1). The indication for a scheduling request may be implicit. There may be an ACK/NACK for each block, and the WTRU may employ four cyclic shifts of the base CGS to indicate ACK/NACK on one of two configured RBs (e.g., a WTRU may send HARQ-ACK/NACK for two transport blocks). Each sequence of the four sequences may indicate (ACK, ACK), (ACK, NACK), (NACK, ACK), or (NACK, NACK). The description below may be applicable to at least the case where the WTRU sends ACK/NACK for one or two transport blocks.

Figures 4B, 4C:
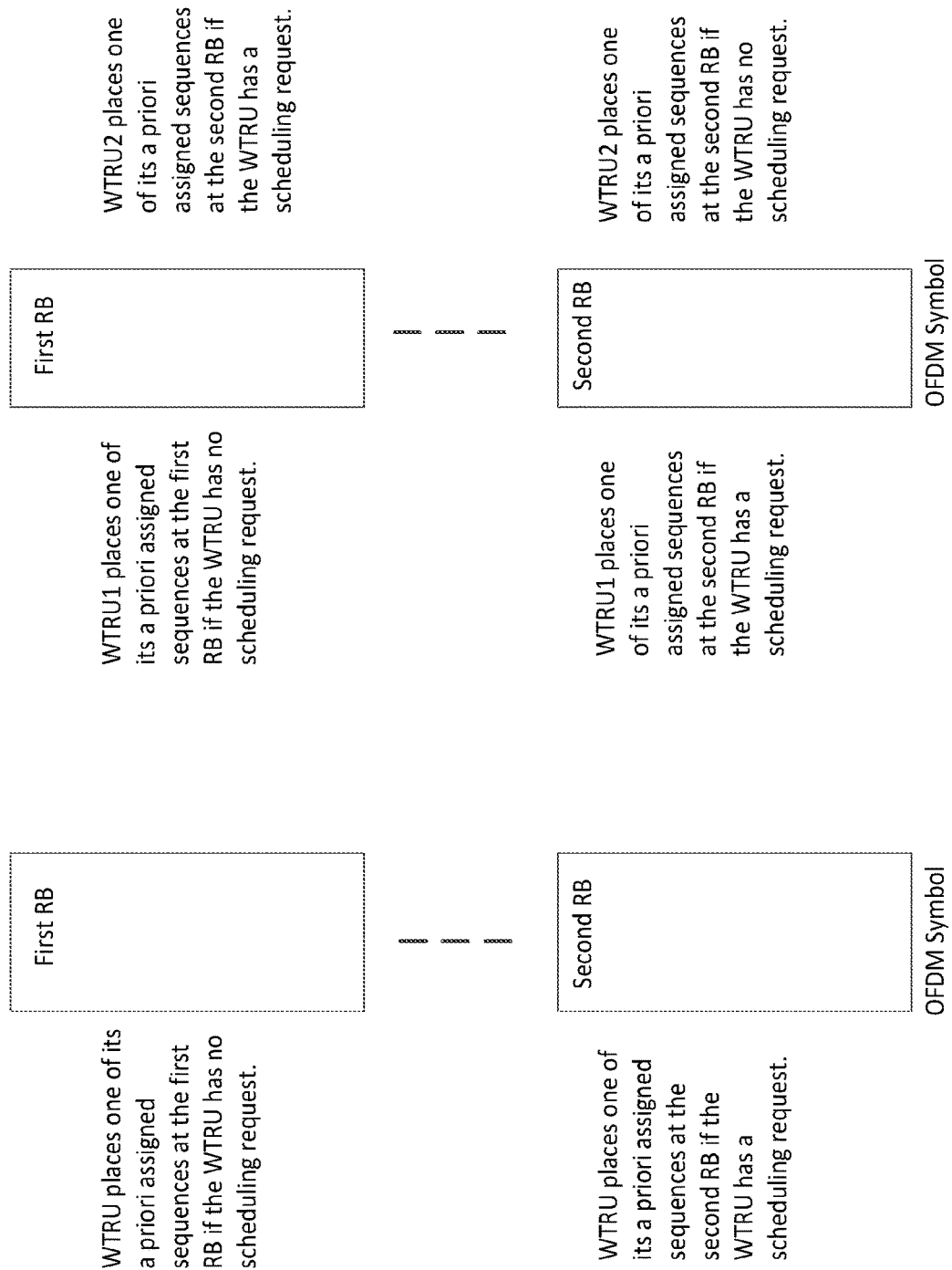
FIG. 4B is a diagram illustrating an example of a WTRU sending an ACK/NACK for one or more transport blocks.
FIG. 4C is a diagram illustrating an example of two WTRUs sending an ACK/NACK for one or more transport blocks.

FIG. 4B shows an example of a WTRU sending an ACK/NACK for one or more transport blocks. In the example, a WTRU may place a first one of its pre-assigned sequences at a first RB if the WTRU has no scheduling request and place a second one of its pre-assigned sequences at a second RB if the WTRU has a scheduling request.

The priori known RBs that a WTRU may employ to place a sequence (e.g., either of two cyclic shift sequences) may be communicated to the WTRU in one or more of the following ways. The WTRU may receive two identifiers from a network (e.g., a gNB), where each identifier may uniquely identify the location (e.g., time and subcarrier indices) of a RB. The WTRU may receive one identifier which identifies the location of a first RB. The WTRU may determine the location of a second RB from the location of the first RB using a certain pattern (e.g., a known or preconfigured pattern). For example, the location of the second RB might be an adjacent RB in a contiguous RB allocation or the location of the second RB might be an RB with a known (e.g., a preconfigured) shift in time and/or subcarrier space (e.g., a non-contiguous RB). A shift in subcarrier domain (e.g., frequency) may be larger than a threshold (e.g., a preconfigured number) in order to have uncorrelated or less correlated frequency response between the first and second RBs.

For implicit SR indications, the choice of the first and second RB may not be the same across multiple (e.g., all) WTRUs. For example, WTRUs whose cyclic shift sequences are derived from the same base sequence may be grouped to operate in the same pair of RBs. A subset of available cyclic shifts of a base sequence may be assigned to a group of WTRUs. For instance, if the base sequence is of length 12, 12 cyclic shift sequences (including zero cyclic shift) may be derived and each pair of cyclic shifts may be assigned to one WTRU among a group of 6 WTRUs. For example, one or more (e.g., all) WTRUs from a group of WTRUs may use the second RB to send an ACK/NACK when the one or more WTRUs have a scheduling request, and they may use the first RB otherwise. In another instance, a first portion of a group of WTRUs may use the second RB to send an ACK/NACK, when the first portion of WTRUs have a scheduling request and may use the first RB otherwise. A second portion of the WTRUs (e.g., the remaining portion of the WTRUs) may use the first RB to send an ACK/NACK, when the second portion of WTRUs have a scheduling request and may use the second RB otherwise.

For example, the portion indicated above may be a half (e.g., 3 WTRUs out of 6) or a third (e.g., 2 WTRUs out of 6) of a group of WTRUs. Assignment of the first and second RB to a portion of the group of WTRUs may change (e.g., depending on what slot the RBs belong).

FIG. 4C depicts an example of two WTRUs sending ACK/NACK for one or more transport blocks. In the example, a first WTRU (e.g., WTRU1) may place a first one of its assigned (e.g., preconfigured) sequences at a first RB if the first WTRU has no scheduling request and may place a second one of its assigned sequences at a second RB if the first WTRU has a scheduling request. A second WTRU (e.g., WTRU2) may place a first one of its assigned sequences at the first RB if the second WTRU has a scheduling request and may place a second one of its assigned sequences at a second RB if the second WTRU has no scheduling request.

SR indications may be provided explicitly, in which case a WTRU may employ four cyclic shifts of the same base computer generated sequence (CGS) to indicate ACK/NACK and may have one or more restrictions in the assignment of the sequences. One or more (e.g., each) of the four sequences may be used to indicate ACK or NACK. Depending on whether there is scheduling request or not, one (e.g., only one) of the four sequences may be transmitted. A sequence may be assigned to indicate one of the following four cases: (ACK, SR=0), (NACK, SR=0), (ACK, SR=1), or (NACK, SR=1). A cyclic shift of the base sequence may be assigned to each of the four cases according to a design criteria.

A criteria may be to minimize potential interference (e.g., due to channel imperfection while decoding a sequence) among WTRUs (e.g., whose cyclic shift sequences may be adjacent to each other). For example, consider four cyclic shifts of 1, 2, 3 and 4 of a base sequence. One or more of the following factors may be taken into consideration when determining which cyclic shifts to use. First, the amount of UL traffic may be less than (e.g., by multiple folds) downlink traffic. This may indicate that the probability of SR=1 (e.g., having UL traffic) may be less than (e.g., by multiple folds) that the probability of SR=0. Second, adjacent cyclic shifts sequences may have more interference to each other (e.g., due to channel imperfection). The following assignment may be used: (ACK, SR=0, CS=1×$\Delta_{shift}^{PUCCH}$), (NACK, SR=0, CS=2×$\Delta_{shift}^{PUCCH}$), (ACK, SR=1, CS=0×$\Delta_{shift}^{PUCCH}$), and (NACK, SR=1, CS=3×$\Delta_{shift}^{PUCCH}$), where CS may indicate a cyclic shift from the base sequence and $\Delta_{shift}^{PUCCH} \in \{1,2,3\}$. For instance, in case of negligible frequency selectivity, $\Delta_{shift}^{PUCCH}=1$ and CS=0, 1, 2, 3 may be used. In case of moderate frequency selectivity, $\Delta_{shift}^{PUCCH}=2$ and CS=0, 2, 4, 6 may be used. If SR=1 has much less probability than SR=0, there would be less chance that two WTRUs (e.g., when sending their sequences in the same RB) have their groups of sequences adjacent to each other and that the WTRUs send two sequences that have adjacent cyclic shifts. The WTRUs may also have less chance of interference to each other (e.g., when a gNB decodes the corresponding sequences of the WTRUs).

The following mapping of the cyclic shifts of the base sequence to WTRU1 and WTRU2 may use the following:
  WTRU1: (ACK, SR=0, CS=1×$\Delta_{shift}^{PUCCH}$), (NACK, SR=0, CS=2×$\Delta_{shift}^{PUCCH}$), (ACK, SR=1, CS=0×$\Delta_{shift}^{PUCCH}$), and (NACK, SR=1, CS=3×$\Delta_{shift}^{PUCCH}$)
  WTRU2: (ACK, SR=0, CS=5×$\Delta_{shift}^{PUCCH}$), (NACK, SR=0, CS=6×$\Delta_{shift}^{PUCCH}$), (ACK, SR=1, CS=4×$\Delta_{shift}^{PUCCH}$), and (NACK, SR=1, CS=7×$\Delta_{shift}^{PUCCH}$)

The cyclic shifts may indicate the relative difference of the cyclic shifts with the base sequence. Considering that SR=0 has higher probability (e.g., by multiple folds) than SR=1, WTRU1 may send CS=3×$\Delta_{shift}^{PUCCH}$ or 4×$\Delta_{shift}^{PUCCH}$ (e.g., most of the time) and WTRU2 may send CS=6×$\Delta_{shift}^{PUCCH}$ or 7×$\Delta_{shift}^{PUCCH}$ (e.g., most of the time), which may lead to less interference among the sequences since the cyclic shifts of the received sequences is not adjacent and are far apart. Where one of the WTRUs have SR=1, the cyclic shifts of the received sequences may not be adjacent. Where both WTRUs have SR=1, there may be adjacent cyclic shifts of the received sequences. Selecting assignment of the cyclic shifts may result in a robust indication of AC/NACK and SR.

A criteria may be minimizing potential interference, due to channel imperfection while decoding the sequence (e.g., within multiple cyclic shift sequences of the same WTRU). For example, consider four cyclic shifts of 1, 2, 3 and 4 of a base sequence. Because adjacent cyclic shifts of a sequence may have more interference to each other (e.g., due to channel imperfection), the following assignment may be used: (ACK, SR=0, CS=0×$\Delta_{shift}^{PUCCH}$), (NACK, SR=0, CS=2×$\Delta_{shift}^{PUCCH}$), (ACK, SR=1, CS=1×$\Delta_{shift}^{PUCCH}$), and (NACK, SR=1, CS=3×$\Delta_{shift}^{PUCCH}$), where CS indicates a cyclic shift from the base sequence. The assignment may assign the farther apart sequences to ACK and NACK such that the possibility of mis-detection of the sequence assigned to one with another is lowered.

The following mapping of the cyclic shifts of the base sequence to WTRU1 and WTRU2 may be used:

WTRU1: (ACK, SR=0, CS=0×$\Delta_{shift}^{PUCCH}$), (NACK, SR=0, CS=2×$\Delta_{shift}^{PUCCH}$), (ACK, SR=1, CS=1×$\Delta_{shift}^{PUCCH}$), and (NACK, SR=1, CS=3×$\Delta_{shift}^{PUCCH}$)

WTRU2: (ACK, SR=0, CS=4×$\Delta_{shift}^{PUCCH}$), (NACK, SR=0, CS=6×$\Delta_{shift}^{PUCCH}$), (ACK, SR=1, CS=5×$\Delta_{shift}^{PUCCH}$), and (NACK, SR=1, CS=7×$\Delta_{shift}^{PUCCH}$)

The cyclic shifts may indicate the relative difference of the cyclic shifts with the base sequence. A WTRU may employ three cyclic shifts of the (e.g., same) base computer generated sequence (CGS) to jointly indicate an ACK/NACK and a scheduling request (SR). Each of the three sequences may be used to indicate either ACK or NACK and/or whether there is a scheduling request. A sequence may be assigned to each of the following three states of ACK and SR: (ACK, SR=0), (ACK, SR=1), and (NACK, SR=1). A sequence may not be assigned to the case (NACK, SR=0), in which case the action of the gNB may be similar to (e.g., almost the same) as if it were to receive a sequence (e.g., the gNB may perform a retransmission of a transport block and assign an uplink resource for the WTRU (e.g., since SR may be equal to 0, indicating there is no scheduling request)).

A mapping between three successive (adjacent) cyclic shifts and the above-described three states of ACK and SR for two WTRUs whose sequences have successive cyclic shifts may be as follows:

WTRU1: (ACK, SR=0, CS=0×$\Delta_{shift}^{PUCCH}$), (ACK, SR=1, CS=1×$\Delta_{shift}^{PUCCH}$), (NACK, SR=1, CS=2×$\Delta_{shift}^{PUCCH}$)

WTRU2: (ACK, SR=0, CS=3×$\Delta_{shift}^{PUCCH}$), (ACK, SR=1, CS=4×$\Delta_{shift}^{PUCCH}$), (NACK, SR=1, CS=5×$\Delta_{shift}^{PUCCH}$)

The cyclic shifts may indicate the relative difference of the cyclic shifts with the base sequence. This mapping may ensure that when a gNB attempts to decode the sequence with CS=0×$\Delta_{shift}^{PUCCH}$ of WTRU1, there is less chance of a detection error with the sequence CS=3×$\Delta_{shift}^{PUCCH}$ of WTRU2. This mapping may reduce the chance of detecting the sequence of one WTRU with another. When a gNB attempts to decode the sequence with CS=0×$\Delta_{shift}^{PUCCH}$ of WTRU1, there may be a less chance of a detection error with the sequence CS=2×$\Delta_{shift}^{PUCCH}$ (e.g., for NACK and SR=1) for the same WTRU, which may have the least probability of occurrence.

The mapping between three successive (adjacent) cyclic shifts and above-described three states of ACK and SR for two WTRUs whose sequences have successive cyclic shifts may be as follows:

WTRU1: (ACK, SR=0, CS=0×$\Delta_{shift}^{PUCCH}$, (ACK, SR=1, CS=2×$\Delta_{shift}^{PUCCH}$, (NACK, SR=1, CS=1×$\Delta_{shift}^{PUCCH}$)

WTRU2: (ACK, SR=0, CS=3×$\Delta_{shift}^{PUCCH}$), (ACK, SR=1, CS=5×$\Delta_{shift}^{PUCCH}$), (NACK, SR=1, CS=4×$\Delta_{shift}^{PUCCH}$)

The cyclic shifts may indicate the relative difference of the cyclic shifts with the base sequence. This mapping may ensure that when A gNB attempts to decode the sequence with CS=0×$\Delta_{shift}^{PUCCH}$ of WTRU1, there is less chance of detection error with the sequence CS=3×$\Delta_{shift}^{PUCCH}$ of WTRU2. This mapping may reduce the chance of detecting the sequence of one WTRU with another. Also, when a gNB attempts to decode the sequence with CS=0×$\Delta_{shift}^{PUCCH}$ of WTRU1, there is less chance of detection error with the sequence CS=2×$\Delta_{shift}^{PUCCH}$ (e.g., for ACK and SR=1) of the same WTRU, which may have the next highest probability of occurrence than (ACK, SR=0).

A WTRU may transmit a pair of ACK/NACK for a pair of transport blocks (e.g., where the WTRU may successfully decode one of the transport blocks independently of the other one) and may send (ACK, ACK), (ACK, NACK), (NACK, ACK), or (NACK, NACK).

A WTRU may employ four cyclic shifts of the (e.g., same) base computer generated sequence (CGS) to jointly indicate the pair of ACK/NACK and/or a scheduling request (SR). A sequence (e.g., each of the four sequences) may be used to indicate a subset of above-listed states and/or whether there is a scheduling request. A sequence may be assigned as follows:

State 1: (ACK, ACK), and SR=0,
State 2: (ACK, ACK), and SR=1,
State 3: {(ACK, NACK), (NACK, ACK), or (NACK, NACK)} and SR=0,
State 4: {(ACK, NACK), (NACK, ACK), or (NACK, NACK)} and SR=1.

A WTRU may use a separate sequence assignment for (ACK, ACK) cases (e.g., when the chance of sending ACK may be the highest). The gNB may not be able to differentiate between (ACK, NACK), (NACK, ACK), or (NACK, NACK) cases (e.g., when four sequences are assigned). This assignment (e.g., as shown above) may be referred to as bundling or joint assignments of the states, and may result in at most one unnecessary retransmission.

A WTRU may use four cyclic shifts of the (e.g., same) base computer generated sequence (CGS) to jointly indicate the pair of ACK/NACK and/or a scheduling request (SR). A sequence (e.g., each of the four sequences) may be used to indicate a subset of above-listed states and/or whether there is a scheduling request. A sequence may be assigned as follows:

State 1: (ACK, ACK), and SR=0,
State 2: (ACK, ACK), and SR=1,
State 3: {(ACK, NACK), or (NACK, ACK)} and SR=0,
State 4: {(ACK, NACK), or (NACK, ACK)} and SR=1.

By assigning only four sequences, the gNB may not be able to differentiate between (ACK, NACK) or (NACK, ACK) cases. This may cause one unnecessary retransmission. No sequence may be assigned to the case (NACK, NACK), and SR=0, in which case the action of the gNB may be similar to (e.g., almost the same) as if it were to receive a sequence (e.g., the gNB may perform a retransmission for each of the transport blocks and assign an uplink resource for the WTRU (e.g., since SR may be equal to 0, indicating there is no scheduling request)). A sequence may not be assigned to the case (NACK, NACK) and SR=1, e.g., since the case may have the least probability of occurrence. A WTRU at this state may send no sequence and the gNB may retransmit both transport blocks (e.g., from this viewpoint the action of gNB does not change). The gNB may not know that the WTRU has a scheduling request until the next opportunity that the WTRU indicates its scheduling request, e.g., via one of the sequences assigned to (ACK, ACK), and SR=1, or {(ACK, NACK), or (NACK, ACK)} and SR=1.

The following mapping of the cyclic shift sequences to the four states may be used (e.g., for state bundling as disclosed herein). An example of the mapping of the four sequences to four cyclic shifts of a base sequence may be as follows:

(State 1, CS=0×$\Delta_{shift}^{PUCCH}$)
(State 2, CS=3×$\Delta_{shift}^{PUCCH}$)
(State 3, CS=1×$\Delta_{shift}^{PUCCH}$)
(State 4, CS=2×$\Delta_{shift}^{PUCCH}$)

This mapping may ensure a better gNB detection probability when the gNB attempts to detect the received sequence to the states of 1 and 2, which may have the highest detection probability.

The mapping of the four sequences to four cyclic shifts of a base sequence may be as follows:

(State 1, CS=1×$\Delta_{shift}^{PUCCH}$)
(State 2, CS=2×$\Delta_{shift}^{PUCCH}$)
(State 3, CS=0×$\Delta_{shift}^{PUCCH}$)
(State 4, CS=3×$\Delta_{shift}^{PUCCH}$)

This mapping may ensure a better gNB detection probability when the gNB attempts to detect whether the received sequence belongs to WTRU1 or to WTRU2 (e.g., where WTRU2 may have its cyclic shift sequences right after the cyclic shift sequences of WTRU1).

A WTRU may employ six cyclic shifts of the same base CGS to jointly indicate the pair of ACK/NACK and/or SR. A sequence may be assigned to each of the following states:

State 1: (ACK, ACK) and SR=0,
State 2: (ACK, ACK) and SR=1,
State 3: (ACK, NACK) and SR=1,
State 4: (ACK, NACK) and SR=0,
State 5: (NACK, ACK) and SR=0,
State 6: (NACK, ACK) and SR=1, When no sequence is assigned to (NACK, NACK) and SR=0, the behavior of the gNB may be similar to (e.g., almost the same) as if the gNB were to receive a sequence for this state. A sequence may not be assigned to the state (NACK, NACK) and SR=1, e.g., since the state may have the least probability of occurrence. A WTRU may send its scheduling request in the next PUCCH opportunity. For example, when $\Delta_{shift}^{PUCCH}$=1, for a first WTRU, the mapping of a sequence associated to each state to a cyclic shift of a base CGS may be as follows: State 1 to State 6 may be assigned to CS=0,1,2,3,4,5 respectively. For a second WTRU, the mapping of a sequence associated to each state to a cyclic shift of the same base CGS may be: State 1 to State 6 may be assigned to CS=11,10,9,8,7,6 respectively. These mappings may lower the gNB error detection of a sequence (e.g., associated with a high probability state) that belongs to the first WTRU with that of the second WTRU. In another embodiment, when $\Delta_{shift}^{PUCCH}$=2, for a WTRU, the mapping of a sequence associated to each state to a cyclic shift of a base CGS may be as follows: State 1 to State 6 may be assigned respectively to CS=0,2,4,6,8,10 or CS=1,3,5,7,9,11 or CS=0,2,4,7,9,11 or CS=0,3,5,6,8,11. These mappings may lower the error detection among the states of the same WTRU. In an example, the mapping may be based on principles of Gray coding which may ensure that a potential erroneous detection of a sequence with its adjacent cyclic shift causes only one error in the information carried by the sequence (e.g., State 1 to State 6 may be assigned respectively to CS=4,6,0,2,10,8 or CS=5,7,1,3,11,9 or CS=5,7,0,2,11,9).

In examples, in addition to the above six states, there may be two more states: State 7 for (NACK, NACK) and SR=1, and State 8 (NACK, NACK) and SR=0 (e.g., covering all the possible states and a sequence may be assigned to each). For a WTRU, a sequence associated to each state may be mapped to a cyclic shift of a base CGS as follows: State 1 to State 8 may be assigned to CS=0,1,3,4,11,10,8,7 or CS=0,1,4,5,11,10,8,7. These mappings may lower the error detection among the states of the same WTRU. Even if a gNB that receives one of these sequences detects an adjacent cyclic shift in error, the error may be minimized (e.g., out of three pieces of information only one may be in error).

Positive SR and HARQ-ACK may be transmitted on PUCCH (e.g., a short PUCCH) in the same slot. If the HARQ-ACK payload is less than or equal to 2 bits, the WTRU may transmit the HARQ-ACK on the PUCCH resource for SR using the PUCCH format for up to 2 bits (e.g., PUCCH Format A). If the HARQ-ACK payload is more than 2 bits, the WTRU may transmit both SR and HARQ-ACK on the PUCCH resource for HARQ-ACK (e.g., using the PUCCH format for carrying more than 2 bits (e.g., PUCCH Format B)).

Negative SR and HARQ-ACK may be transmitted on PUCCH (e.g., a short PUCCH) in the same slot. If the HARQ-ACK payload is less than or equal to 2 bits, the WTRU may transmit the HARQ-ACK on the PUCCH resource for HARQ-ACK using the PUCCH format for up to 2 bits. If the HARQ-ACK payload is more than 2 bits, the WTRU may transmit both SR and HARQ-ACK on the PUCCH resource for HARQ-ACK using the PUCCH format for carrying more than 2 bits.

For PUCCH format of up to 2 bits (e.g., PUCCH Format A), a resource may include one or more PRB indices, one or two OFDM symbol indices within a slot, and/or a group of two or four sequences/cyclic shifts. A resource may be (e.g., only) associated with one sequence and/or cyclic shift of a sequence. For PUCCH format of more than 2 bits (e.g., PUCCH Format B), a resource may at least include one or more PRB indices and/or one or two OFDM symbol indices within a slot.

A WTRU may determine the PUCCH resource or resource groups through higher layer configuration and/or DCI. For example, the WTRU may be configured by multiple PUCCH resource groups and identify the assigned resource or resource group in each slot using a bit field in DCI. The size of each resource group could be 1, 2 or 4 resources which may be a function of the HARQ-ACK payload. For HARQ-ACK payload of more than 2 bits, a resource group may have one resource. For HARQ-ACK payload of one bit, a resource group may have two resources. For HARQ-ACK payload of 2 bits, a resource group may have 4 resources.

If the WTRU is configured with 4 PUCCH resource groups, the WTRU may identify the resource group in a given slot using a bitfield of 2 bits in DCI. In an example, the number of RBs over which the PUCCH is transmitted can be signaled by higher layer signaling as part of the PUCCH resource configuration. In an example, the WTRU may receive the first OFDM symbol index of PUCCH within a slot through higher layer signaling and determine the second OFDM symbol index of the PUCCH using a formula.

A WTRU may bundle the 2 HARQ-ACK bits using the AND operation. The WTRU may use two resources/sequences for signaling of HARQ-ACK and/or SR, and may apply a pre-defined resource mapping rule (e.g., when positive SR and 2-bit HARQ-ACK are to be transmitted on PUCCH in the same slot or mini-slot). The WTRU may use two resources/sequences for signaling of HARQ-ACK using a different resource mapping rule (e.g., when negative SR and 2-bit HARQ-ACK are to be transmitted on PUCCH in the same slot or mini-slot), as shown in the following table 2B:

TABLE 2B

Example resource mapping rules for signaling HARQ ACK/NACK

| ACK/NACK Bundling | No ACK/NACK Bundling | Resource Mapping |
|---|---|---|
| Positive SR, ACK, ACK | Negative SR, ACK, ACK | (1, 1) |
| Positive SR, NACK, ACK | Negative SR, NACK, ACK | (0, 1) |
| Positive SR, NACK, NACK | | |
| Positive SR, ACK, NACK | | |
| Negative SR, ACK, ACK | Negative SR, NACK, NACK | (0, 0) |
| Negative SR, NACK, ACK | Negative SR, ACK, NACK | (1, 0) |
| Negative SR, NACK, NACK | | |
| Negative SR, ACK, NACK | | |

Figure 5:
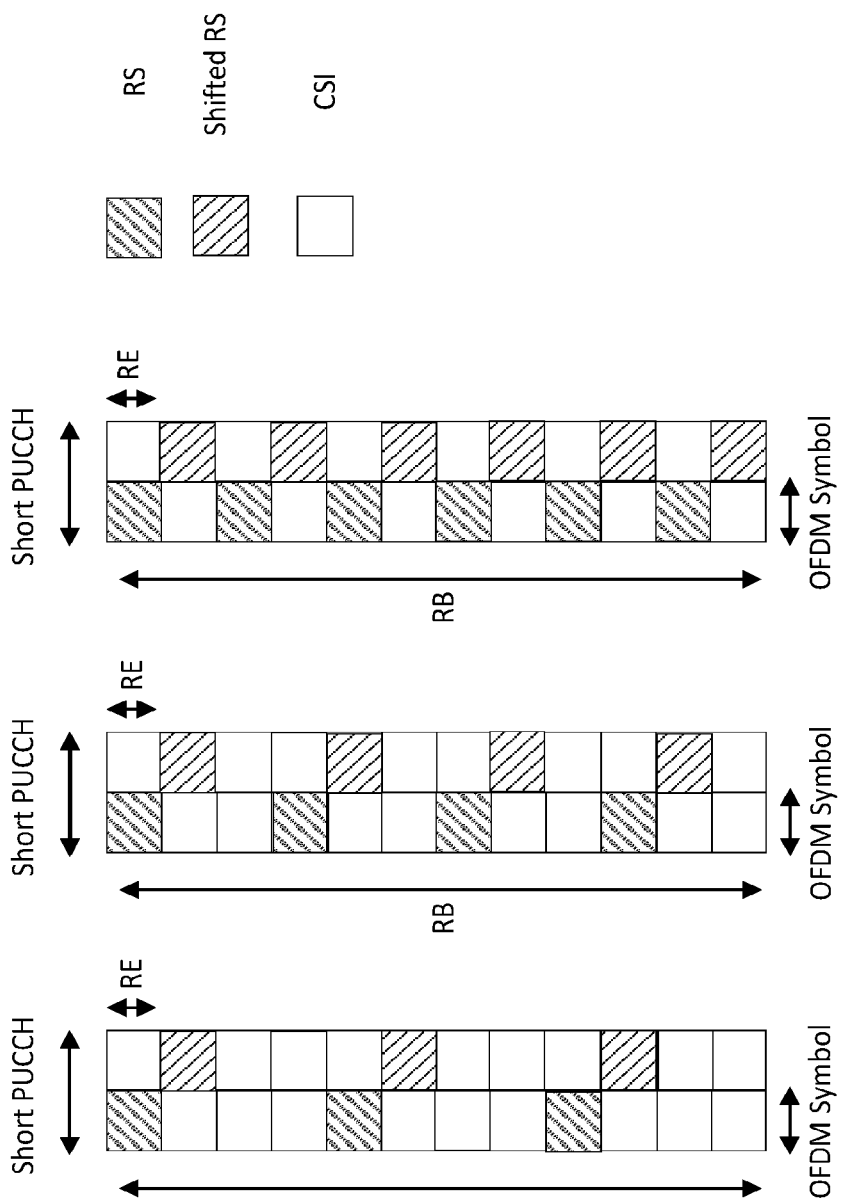
FIG. 5 is a diagram illustrating ACK/NACK or SR transmission using frequency shifted reference symbol or reference signal (RS).

ACK/NACK/SR transmission (e.g., on a short PUCCH with a duration of two symbols) may be provided. FIG. 5 is an example diagram that may show ACK/NACK and/or SR transmission. The transmission may use frequency shifted RS and may be implicit. For example, the WTRU may implicitly transmit one or two bits of ACK/NACK and/or SR using different frequency shifts of Reference Symbol (RS) sequences, such as a CAZAC sequence, in the two consecutive OFDM symbols that may comprise a PUCCH (e.g., a Short PUCCH). The RS sequences for the two consecutive OFDM symbols may be the same or different cyclic time or frequency shifts of a base sequence. The ACK/NACK or SR signaling may be implicit and may be additional to the CSI being transmitted on the resource elements that may not be used for RS. An implicit transmission may be an efficient way for UCI signaling in the UL.

In a SR transmission, the WTRU may not shift the RS in the frequency in the second OFDM symbol when the WTRU does not request to be scheduled and may shift the RS in the frequency when the WTRU requests to be scheduled as shown in Table 3. In a ACK/NACK/DTX transmission, the WTRU may not shift the RS in the frequency in the second OFDM symbol in the case of NACK or DTX signaling and may shift the RS in the frequency in the second OFDM symbol when transmitting ACK.

Table 3 shows an example mapping of 1-bit ACK/NACK/DTX or SR to RS frequency shift in the second OFDM symbol

TABLE 3

Example mapping of ACK/NACK/DTX or SR to RS frequency shifts

| RS frequency shift in the second OFDM symbol = 0 | RS frequency shift in the second OFDM symbol = 1 |
|---|---|
| SR = 0 | SR = 1 |
| NACK/DTX | ACK |

The WTRU may use a lower RS density to transmit a higher number of bits as shown in Table 4. For example, the WTRU may use 1/2 RS density for signaling of one bit of ACK/NACK or SR in the UL. As another example, the WTRU may use 1/3 RS density to signal more than one bit of information, e.g. ACK/NACK/DTX. Discontinuous Transmission (DTX) may imply that neither ACK nor NACK may be transmitted. An example mapping of ACK/NACK/DTX to RS Shift in the second OFDM symbol is shown in Table 4.

TABLE 4

Example mapping of ACK/NACK/DTX to RS frequency Shifts

| RS frequency shift in the second OFDM symbol = 0 | RS frequency shift in the second OFDM symbol = 1 | RS frequency shift in the second OFDM symbol = 2 |
|---|---|---|
| DTX | NACK | ACK |

The WTRU may transmit (e.g., simultaneously transmit) 1-bit ACK/NACK and 1-bit SR using the RS shift approach with the lower RS density of 1/4. An example mapping of ACK/NACK and SR to RS Shift in the second OFDM symbol is shown in Table 5. The WTRU may use four RS frequency shifts for signaling 2-bit ACK/NACK information as shown in Table 5.

TABLE 5

Example mapping of ACK/NACK and SR to RS frequency Shifts

| RS frequency shift in the second OFDM symbol = 0 | RS frequency shift in the second OFDM symbol = 1 | RS frequency shift in the second OFDM symbol = 2 | RS frequency shift in the second OFDM symbol = 3 |
|---|---|---|---|
| NACK/DTX | ACK | ACK | NACK/DTX |
| SR = 0 | SR = 0 | SR = 1 | SR = 1 |
| A/N = [0 0] | A/N = [1 0] | A/N = [1 1] | A/N = [0 1] |

Figure 6:
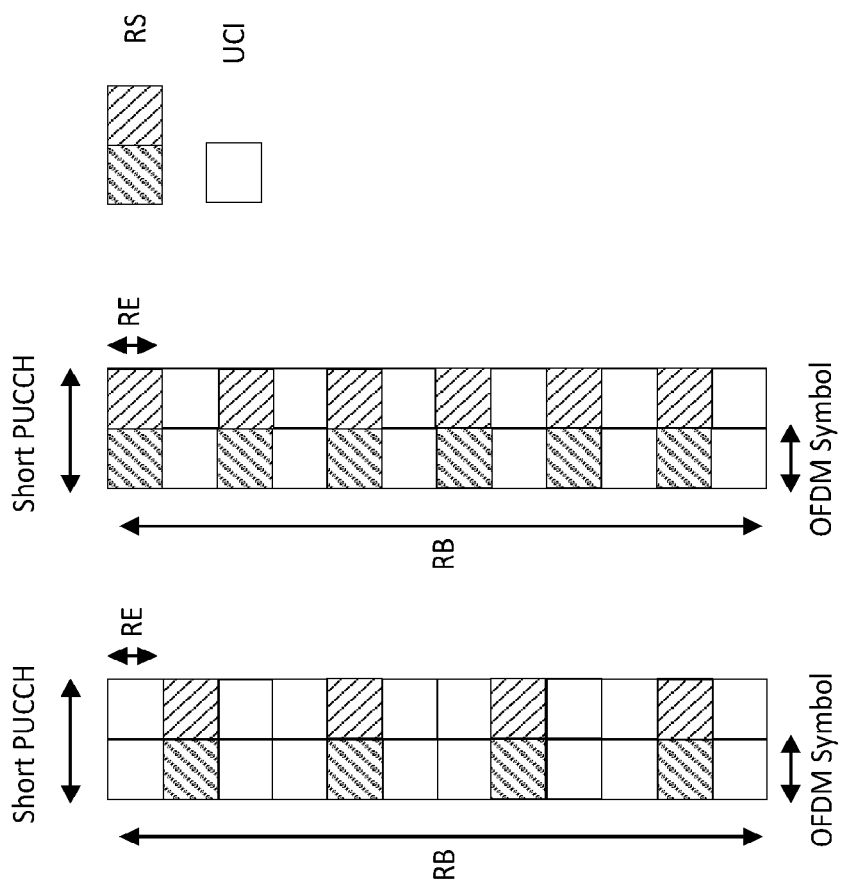
FIG. 6 is a diagram illustrating ACK/NACK and/or SR transmission using time domain cover code on RS.

FIG. 6 is an example diagram that may show ACK/NACK and/or SR transmission using time domain cover code on RS. This may be done implicitly. The WTRU may transmit one bit of ACK/NACK and/or SR by applying a time domain cover code on Reference Symbol (RS) sequences, such as a CAZAC sequence, in the two consecutive OFDM symbols that may comprise a PUCCH (e.g., a short PUCCH). That may be done irrespective of the RS density of the PUCCH. Two variants of this approach with RS density of 1/2 and 1/3 may be seen in FIG. 6. The time domain codes may be length-2 Walsh-Hadamard Orthogonal codes.

An example mapping of SR to cover codes is shown in Table 6. When the WTRU does not request to be scheduled, it may use cover code of [1 1] on the two RS symbols (e.g., which may be the equivalent to not applying any cover code). When the WTRU requests to be scheduled, then it may use cover code [1 −1] on the two RS symbols. For transmission of 1-bit ACK/NACK/DTX, the WTRU may use cover code of [1 1] on the two RS symbols to signal NACK/DTX and cover code [1 −1] to signal ACK.

TABLE 6

Example mapping of SR or ACK/NACK/DTX to time domain cover codes on RS

| | Cover Code = [1 1] | Cover Code = [1 −1] |
|---|---|---|
| 1-bit SR | SR = 0 | SR = 1 |
| 1-bit ACK/NACK/DTX | NACK/DTX | ACK |

Figure 7:
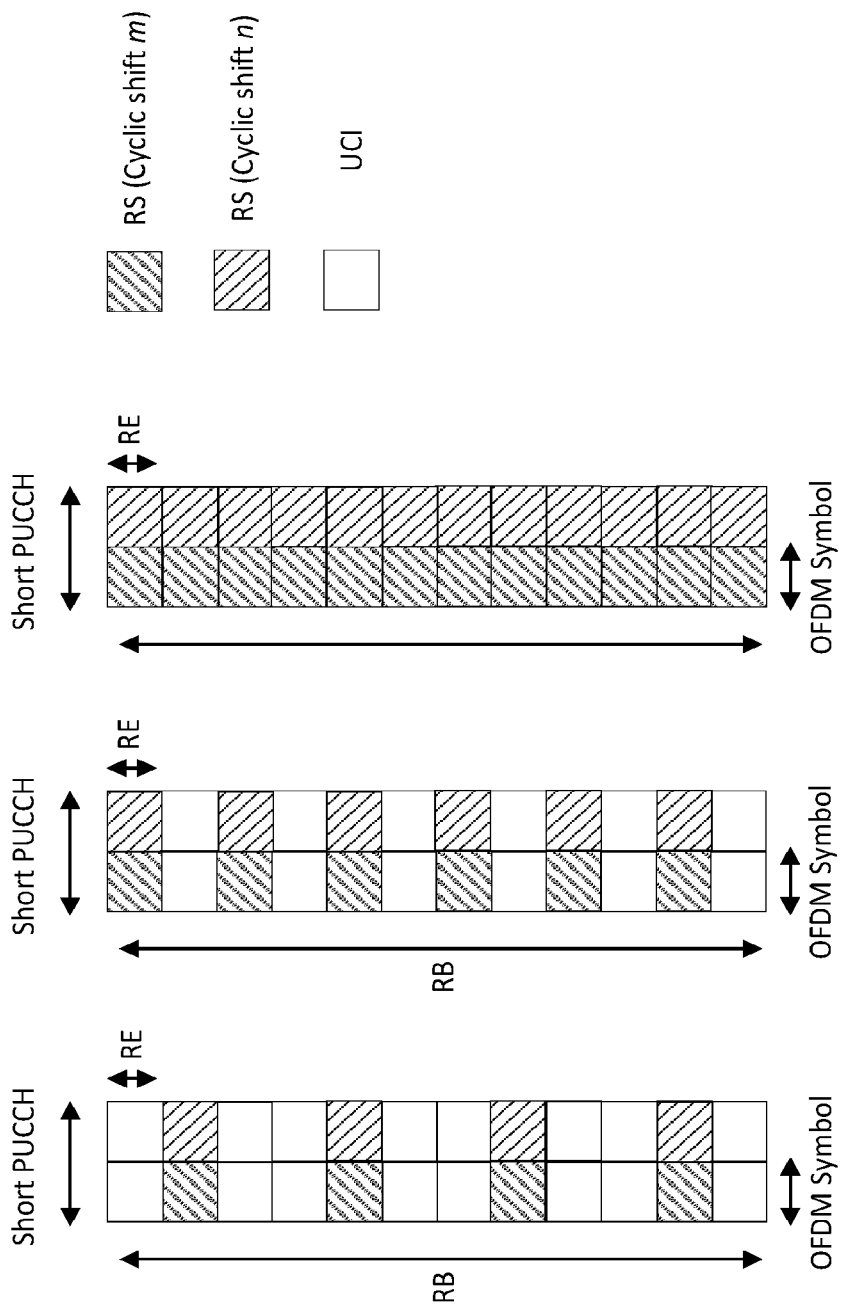
FIG. 7 is a diagram illustrating ACK/NACK and/or SR transmission using differential cyclic time shifts for RS.

A WTRU may implicitly transmit one or two bits of ACK/NACK and/or SR by applying respective (e.g., different) cyclic time shifts of the RS base sequence (e.g., a CAZAC sequence) in the OFDM symbol(s) (e.g., each of two consecutive OFDM symbols) of the PUCCH (e.g., a short PUCCH). FIG. 7 is an example diagram that may show ACK/NACK and/or SR transmission (e.g., implicit transmission) using differential cyclic time shifts for RS. Three example scenarios with RS density of 1/1, 1/2, and 1/3 may be shown. With RS density of 1/1, the WTRU may apply a sequence based scheme for ACK/NACK and/or SR transmission; other UCI (e.g., CSI, PMI, RI, etc.) may or may not be transmitted in this scenario. When the RS density is lower than 100%, UCI, ACK/NACK and/or SR may be multiplexed on the same PUCCH resources (e.g., short PUCCH resources). For example, for transmitting 1-bit of ACK/NACK or SR, the WTRU may use the cyclic shift of m for the RS in the first OFDM symbol and the cyclic time shift of n for the RS in the second OFDM symbol. If both cyclic time shifts are the same (e.g., m=n), then it may imply that the WTRU does not request to be scheduled. When the cyclic time shifts on the two OFDM symbols are different (e.g., m≠n), then it may imply that the WTRU may be requesting to be scheduled for the UL transmission. The UL transmission may be PUSCH. For transmission of 1-bit ACK/NACK/DTX, the WTRU may use the same cyclic time shift for the two RSs on two different OFDM symbols to signal NACK/DTX and use a different cyclic time shift for the two RSs to signal ACK. Table 7 shows an example mapping of SR or ACK/NACK/DTX using different cyclic time shifts for RS.

TABLE 7

Example mapping of SR or ACK/NACK/DTX using different cyclic time shifts for RS

| | Same CAZAC Cyclic Shift for both OFDM symbols (m = n) | Different CAZAC Cyclic Shift for both OFDM symbols (m ≠ n) |
|---|---|---|
| 1-bit SR | SR = 0 | SR = 1 |
| 1-bit ACK/NACK/DTX | NACK/DTX | ACK |

Figure 8:
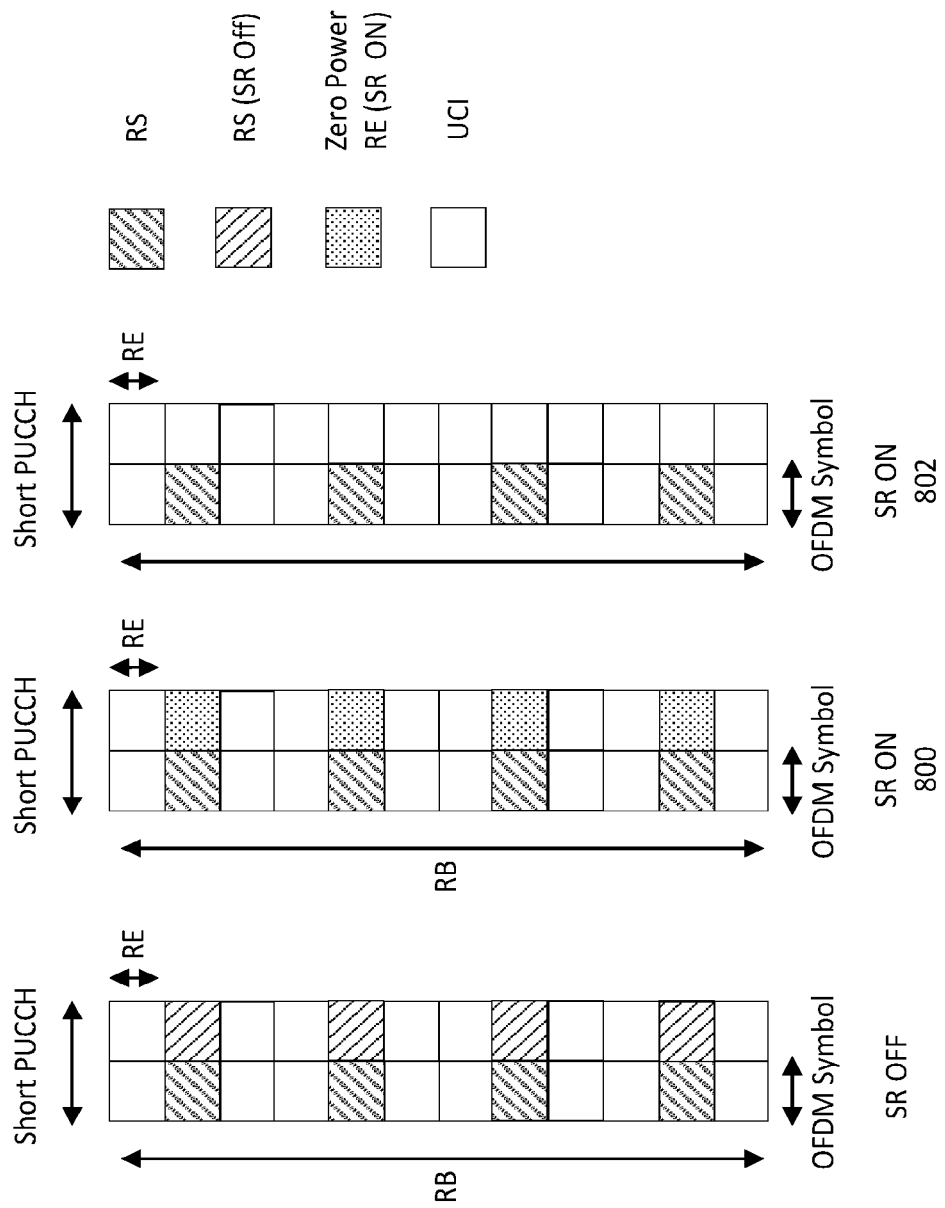
FIG. 8 is a diagram illustrating SR transmission using RS on-off keying.

FIG. 8 shows an example diagram for SR transmission using RS on-off keying, which may be implicit. The WTRU may transmit one bit of ACK/NACK and/or SR by turning on or off the Reference Symbols (RS) on the second OFDM symbol of the two consecutive OFDM symbols comprising a PUCCH (e.g., a short PUCCH). This may be done implicitly.

As shown in Table 8, when the WTRU does not request to be scheduled, such as when the SR is off, the WTRU may transmit RS on the second OFDM symbol. When the WTRU does request to be scheduled, such as when SR is equal to one, then the WTRU may not transmit RS on the second OFDM symbol.

As shown at 800 in FIG. 8, when the WTRU does request to be scheduled and may not transmit RS on the second OFDM, the WTRU may turn off the RS (e.g., not transmitting the RS) on the second OFDM symbol. The WTRU may distribute the power of the RS on the remaining REs of the second OFDM symbol within the PUCCH used for UCI transmission. The turned off REs on the second OFDM symbol may be interpreted as reserved REs by the receiver with no transmission, such as a zero power RE. By distributing power from RS to UCI, the BLER performance of UCI may be improved.

As shown at 802 in FIG. 8, when the WTRU does request to be scheduled and may not transmit RS on the second OFDM, the WTRU may turn off the RS (e.g., not transmitting the RS) on the second OFDM symbol. The WTRU may reallocate REs on the second OFDM symbol to the UCI transmission. For example, no RS may be transmitted on the second OFDM symbol. In this case the coding rate for the UCI transmission may be lower, which may result in better BLER performance for the UCI. The rate matching may be different for UCI regardless of whether SR may be transmitted or not. Table 8 shows an example mapping of SR to the presence of RS in the second OFDM symbol.

TABLE 8

Example mapping of SR to the presence
of RS in the second OFDM symbol

| RS transmitted on the second OFDM Symbol | RS not transmitted on the second OFDM Symbol |
|---|---|
| SR = 0 | SR = 1 |

Figure 9:
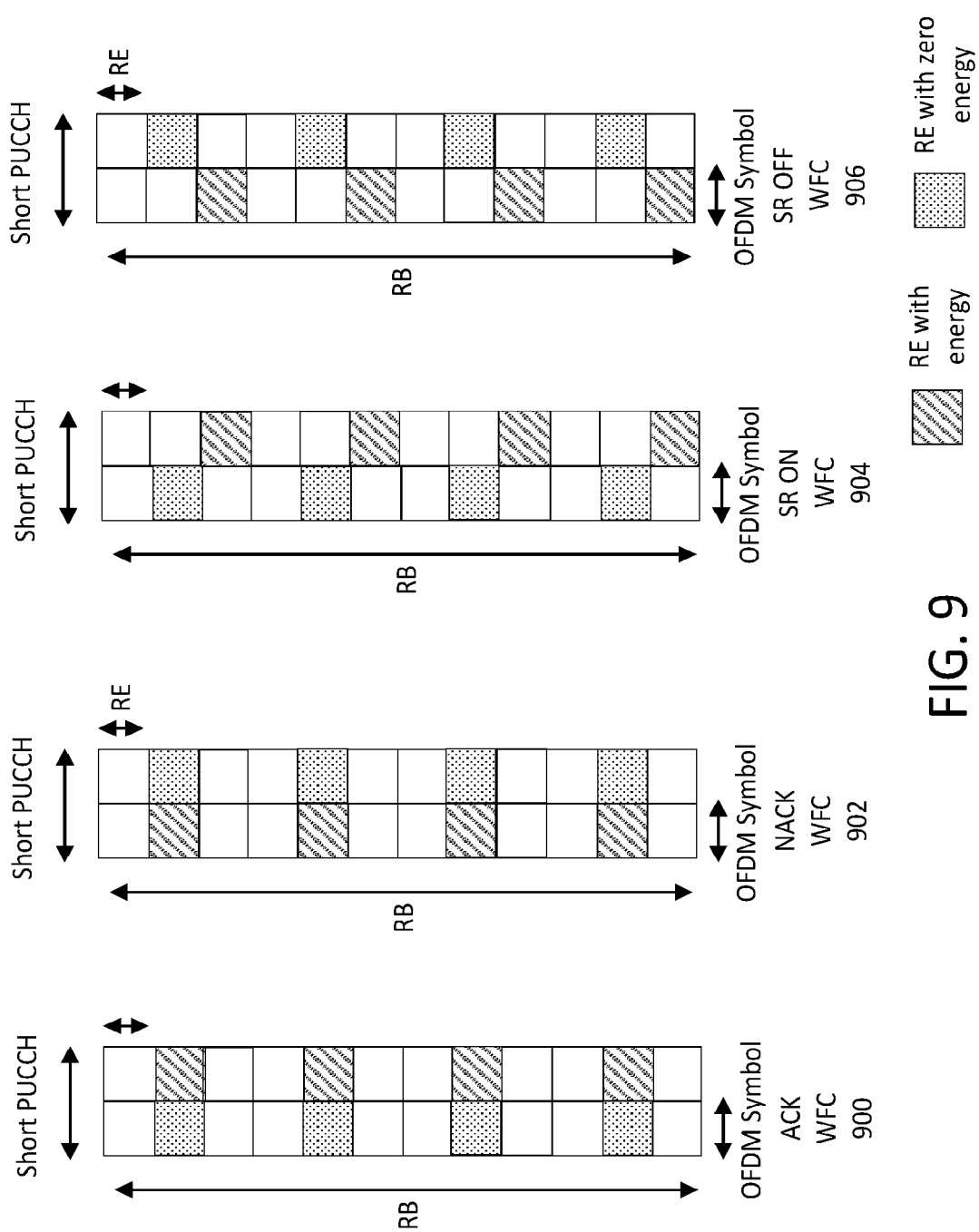
FIG. 9 is a diagram illustrating SR transmission using RS with waveform coding.

FIG. 9 shows an example diagram for ACK/NACK and/or SR transmission (e.g., implicit transmission of ACK/NACK and/or SR) using RS with waveform coding. The waveform coding may include PPM, Manchester coding, and/or the like. The WTRU may encode one bit of ACK/NACK and/or SR by using multiple on (e.g., RS is transmitted) OFDM symbols and off (e.g., RS is not transmitted) OFDM symbols. The WTRU may encode one bit of ACK/NACK and/or SR by changing the position of the on and off OFDM symbols. Manchester coding may be applied between multiple (e.g., two) OFDM symbols of a multi-symbol (e.g., two-symbol) PUCCH (e.g., a short PUCCH).

As shown at 900 and 902 in FIG. 9, ACK may be encoded as follows: one or more REs of a second OFDM symbol may have energy and the same REs in a first OFDM symbol may have zero energy. NACK may be encoded as follows: one or more REs of a first OFDM symbol may have energy and the same REs in the following OFDM symbol may have zero energy.

As shown at 904 and 906 in FIG. 9, SR=1 (e.g., SR is on) may be encoded as follows: one or more of REs of a second OFDM symbol may have energy and one or more of REs in a first OFDM symbol that are shifted up by 1 from the one or more REs of the second OFDM symbol may have zero energy. SR=0 (e.g., SR is off) may be encoded as follows: one or more of REs of a first OFDM symbol may have energy and one or more of REs of a second OFDM symbol that are shifted up by 1 from the one or more REs of the first OFDM symbol may have zero energy.

The WTRU may use any combination of the schemes proposed herein for ACK/NACK and/or SR signaling in the UL. As disclosed herein, a WTRU may use a number of methods to implicitly signal one or more bits of UCI information. For example, the WTRU may signal one or more bits of UCI information using any combination of frequency shifted RS and/or Time Domain Cover Code on RS, differential cyclic time shifts for RS, RS on-off keying, RS with waveform coding, and/or the like.

Figure 10:
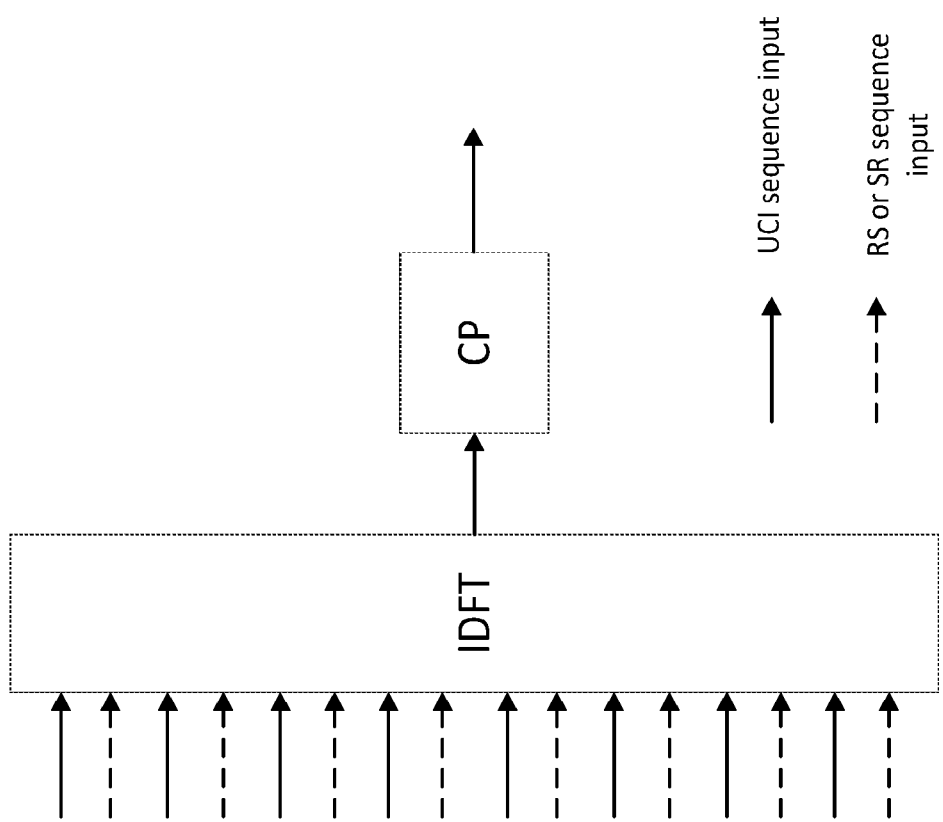
FIG. 10 is a diagram illustrating frequency division multiplexing of UCI and SR.

Signaling of a SR in a PUCCH (e.g., a short PUCCH) may be provided. The signaling may be explicit. SR and UCI may be signaled in a same OFDM symbol. UCI and SR may be transmitted by multiplexing the sequences or symbols corresponding to the UCI and the SR in frequency as shown in FIG. 10. Since the SR and UCI symbols may be separated in frequency, the same sequence may be used to transmit both types of data. When the WTRU does not have a SR to transmit, the subcarriers reserved for SR transmission may be loaded with zeros.

FIG. 10 shows an example diagram for frequency division multiplexing of UCI and SR. The SR and reference symbols (RS) may be transmitted on the same subcarriers but on different OFDM symbols. In OFDM symbols where SR may not be scheduled to be transmitted, the subcarriers allocated to RS/SR may be used for the transmission of reference symbols.

There may be OFDM symbols where SR may be scheduled to be transmitted. If the WTRU does not have a scheduling request to transmit, the subcarriers allocated to RS/SR may be used for the transmission of reference symbols.

There may be OFDM symbols where SR is scheduled to be transmitted. If the WTRU has a scheduling request to transmit, the subcarriers allocated to RS/SR may be used for the transmission of the SR sequence. The receiver may use the SR sequence to also estimate the channel and/or decode the UCI.

RS and SR sequences may be chosen to be different. For example, they may be different cyclic shifts of the same base sequence or they may be two different base sequences. The sequences may be Zadoff Chu sequences, CAZAC sequences, and/or the like.

Orthogonality between the sequences transmitted by a WTRU may be achieved in frequency domain by allocating different subcarriers to the UCI and SR. Orthogonality between the sequences transmitted by different WTRUs may be achieved in frequency domain and/or using orthogonal sequences. For example, in FIG. 11, WTRU1 and WTRU2 may use orthogonal sequences for the UCI and orthogonal sequences for the SR.

Figure 11:
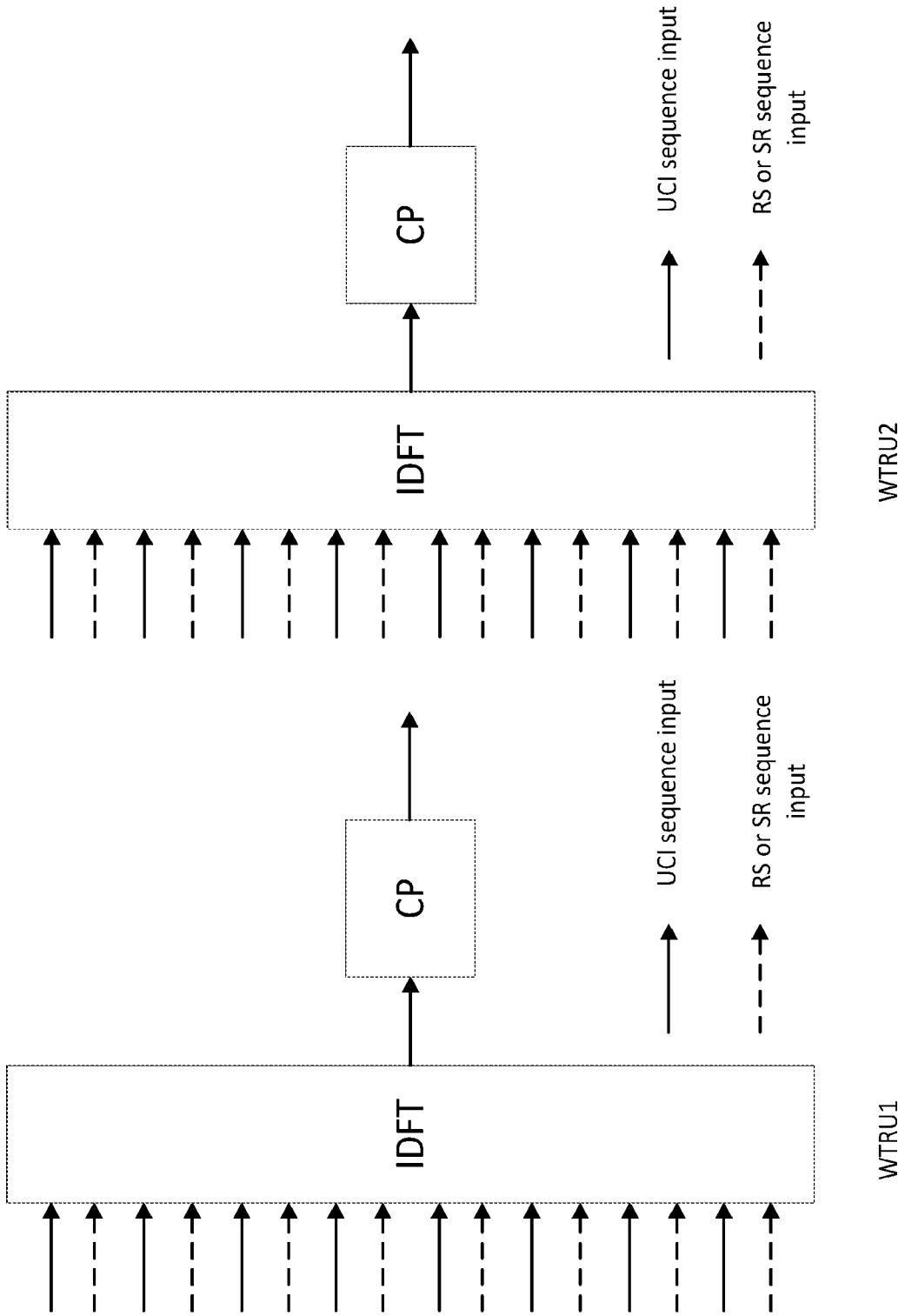
FIG. 11 is a diagram illustrating UCI and SR transmission by one or more WTRUs.

FIG. 11 shows an example diagram for UCI and SR transmission by one or more WTRUs. The number of subcarriers to transmit UCI and SR, or to transmit UCI or SR only, may be different. For example, K subcarriers may be sufficient for the transmission of UCI (and reference symbols for the decoding of the UCI) or SR, while 2K subcarriers may be required for the transmission of UCI and SR.

The difference in the amount of resources may be managed. For example, the WTRU may be configured with an amount of frequency resources, such as K subcarriers. These resources may be used for the transmission of UCI or SR. When both UCI and SR exist, the amount of resources may be increased. For example, the resources may be increased to 2K. The amount of additional resources and the indices of the additional subcarriers may be determined.

Figure 12:
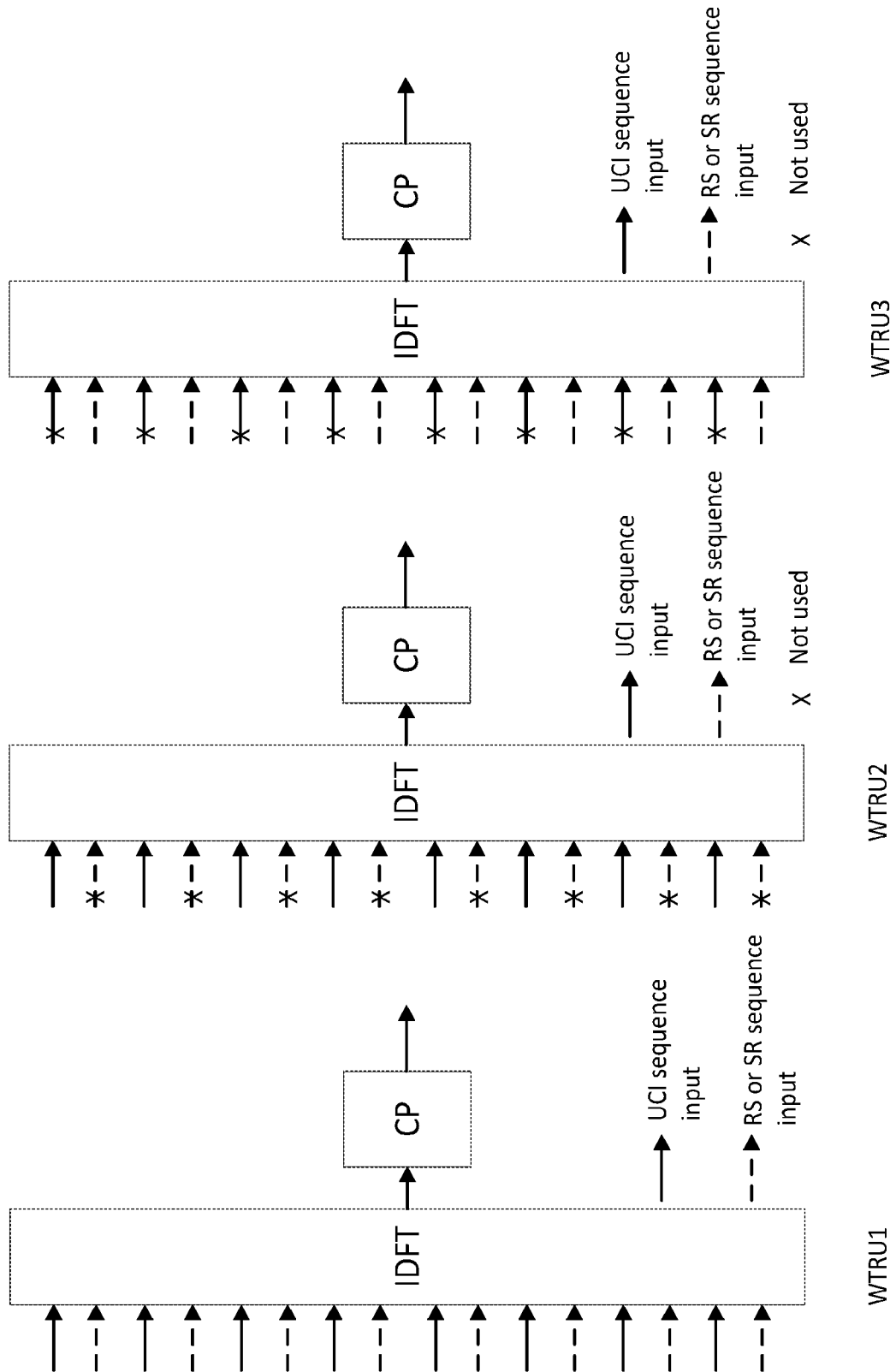
FIG. 12 is a diagram illustrating UCI and/or SR transmission by one or more WTRUs.

FIG. 12 shows an example diagram for UCI and/or SR transmission by one or more WTRUs. When one or more of the WTRUs do not have UCI to transmit or are not configured to transmit SR, they may leave the allocated subcarriers un-used, as shown in FIG. 12. This may occur, for example, in the OFDM symbols when a WTRU is not configured to transmit SR. For illustration purposes, interleaved subcarriers may be shown, but a non-contiguous set of subcarriers may also be used. For example, UCI and SR may be transmitted on two different groups of subcarriers. The RS that may be used for the decoding of the UCI may not be shown, but it is understood that RS transmission may accompany UCI transmission.

If a WTRU has unused resources, it may repeat the transmission of the UCI or the SR in those resources. For example, WTRU2 may repeat the UCI on the subcarriers that may be allocated to the SR. Due to the coding/spreading gain, transmit power may be reduced accordingly. A WTRU may use two different sequences for the SR and the UCI. For example, the sequences may be two different base sequences or two different cyclic shifts of the same base sequence.

Figure 13:
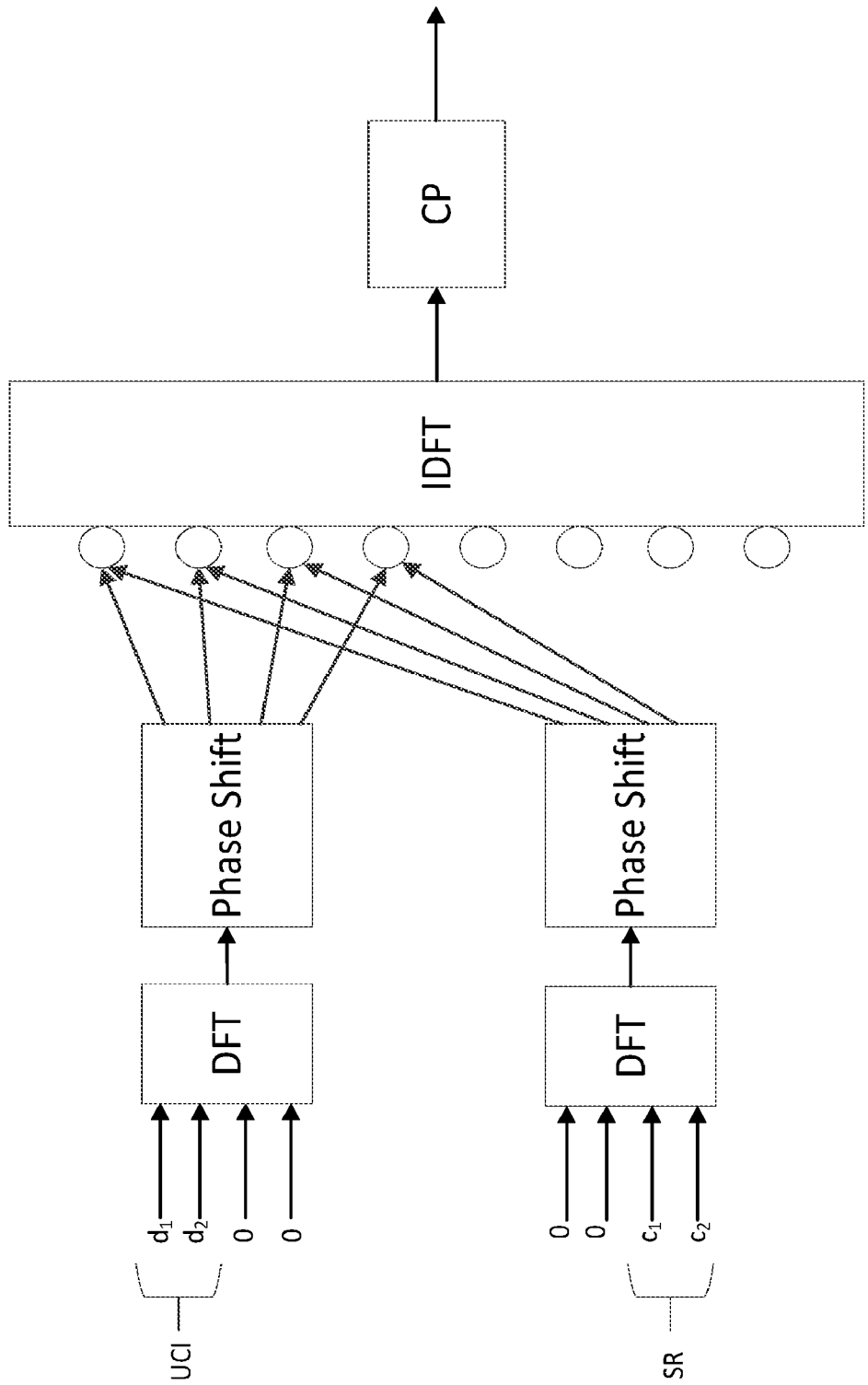
FIG. 13 is a diagram illustrating low PAPR transmission of UCI and SR.

Low PAPR transmission may be provided. FIG. 13 shows an example diagram for PAPR transmission of UCI and SR. In examples (e.g., when UCI and SR are transmitted in a same OFDM symbol), PAPR may be reduced by utilizing time domain multiplexing of the UCI and SR sequences/symbols. This may be achieved by time multiplexing the UCI and SR before DFT precoding as shown in FIG. 13. Input to the different input pins of the DFT block may include the UCI and/or SR. After a phase shifting operation, which may be optional, the output DFT-precoded UCI and SR symbols may be mapped to the same subcarriers. These subcarriers may be contiguous or interleaved. Input to the DFT block may include vector [UCI SR], e.g., [d1 d2 c1 c2].

There may be OFDM symbols where SR is not scheduled to be transmitted. Resource allocated to SR may be used for the transmission of reference symbols.

There may be OFDM symbols where SR is scheduled to be transmitted. If the WTRU does not have a scheduling request to transmit, the resource allocated to SR may be used for the transmission of reference symbols.

There may be OFDM symbols where SR is scheduled to be transmitted. If the WTRU has a scheduling request to transmit, the resources allocated to SR may be used for the transmission of the SR sequence. The receiver may use the SR sequence to estimate the channel and decode the UCI.

The RS and SR sequences may be chosen to be different. For example, they may be different cyclic shifts of the same base sequence or they may be two different base sequences. The sequences may be Zadoff Chu sequences, CAZAC sequences, and/or the like.

Figure 14:
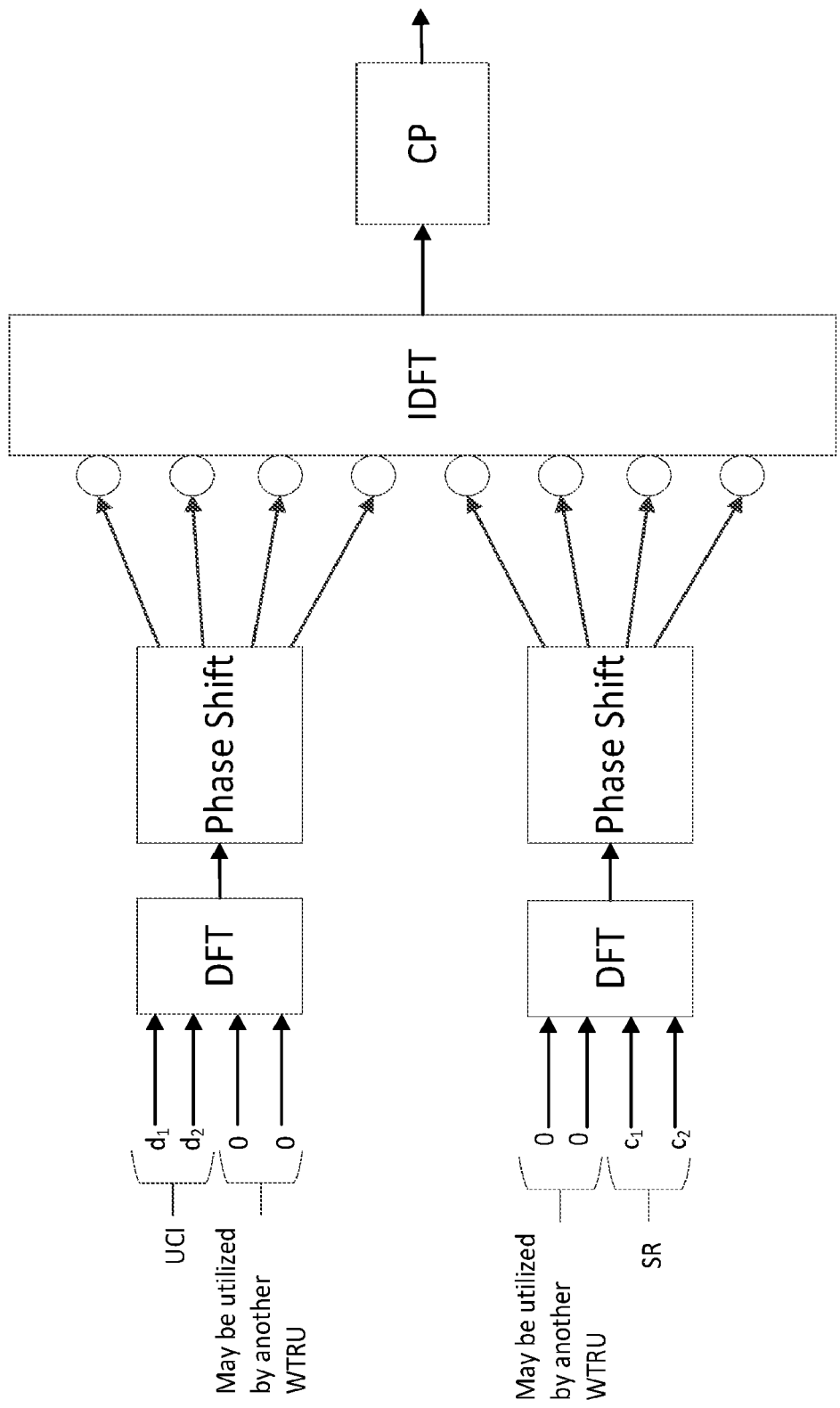
FIG. 14 is a diagram illustrating low PAPR transmission of UCI and SR.

FIG. 14 shows another example diagram for low PAPR transmission of UCI and SR. A precoded UCI and SR may be mapped to different subcarriers. The inputs of a DFT block that may be loaded with zeros by a first WTRU may be used by a second WTRU.

Figure 15:
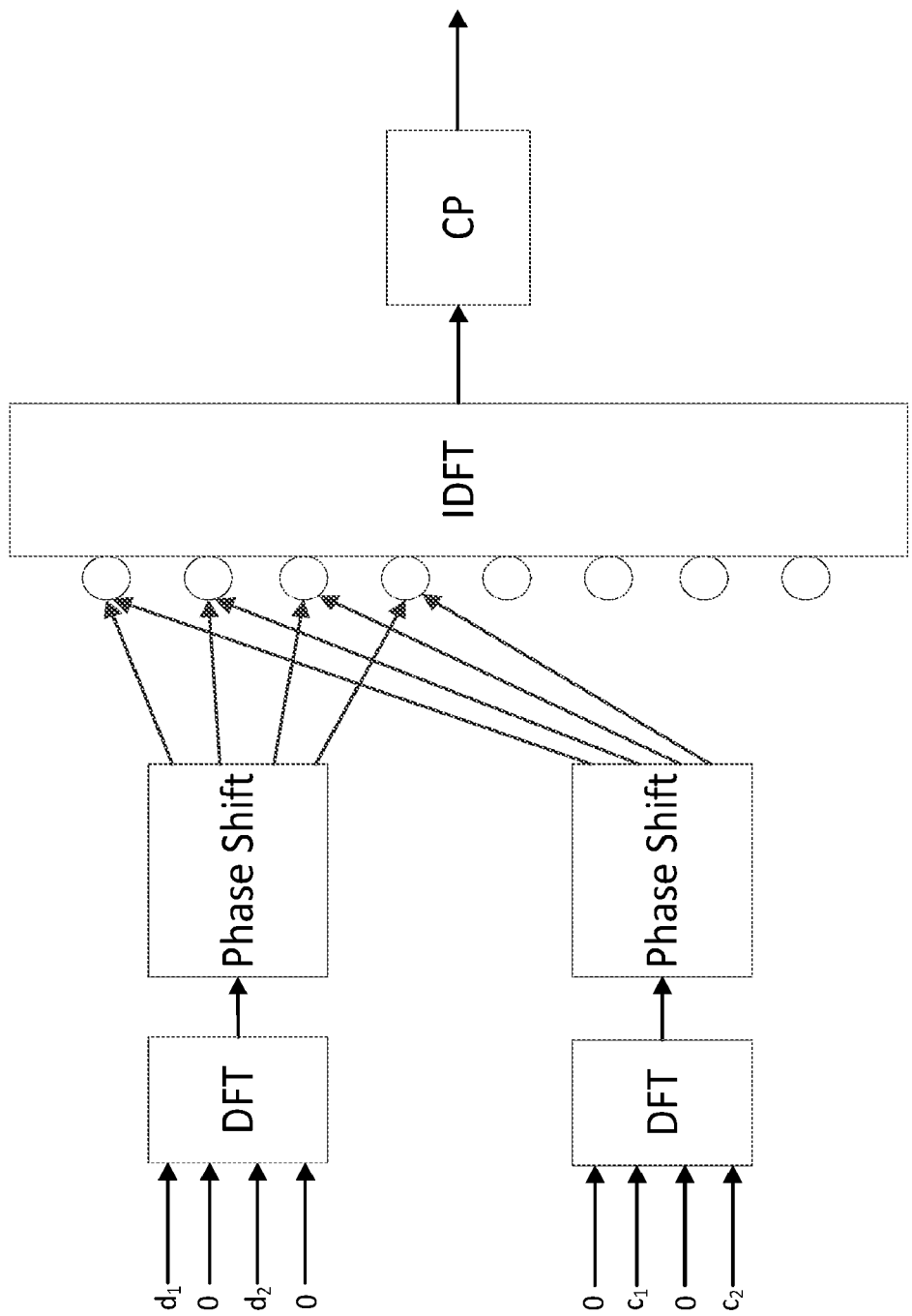
FIG. 15 is a diagram illustrating low PAPR transmission of UCI and SR.

FIG. 15 shows another example diagram for low PAPR transmission of UCI and SR. The UCI and SR may be mapped to the DFT inputs in an interleaved manner while different input pins of a DFT block may be utilized by the UCI and SR symbols. The DFT outputs may be mapped to the same or different subcarriers and the subcarriers may be contiguous or interleaved. When the DFT outputs are mapped to a subcarrier, one DFT block may be sufficient. For example, as shown in FIG. 15, the input to the DFT block may be [d1 c1 d2 c2].

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions. The processes described above may be implemented in a computer program, software, and/or firmware incorporated in a computer-readable medium for execution by a computer and/or processor.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit receive unit (WTRU) comprising a processor and memory, the processor and memory configured to:
   determine to transmit one or more of hybrid automatic retransmission request (HARQ) acknowledgement or negative acknowledgement (ACK/NACK) information and scheduling request (SR) information in a physical uplink control channel (PUCCH) transmission;
   determine a first cyclic shift to be applied for a first symbol of the PUCCH transmission and a second cyclic shift to be applied for a second symbol of the PUCCH transmission, wherein the first and second cyclic shifts are different, and wherein the first and second cyclic shifts are determined based on the HARQ ACK/NACK information and whether the SR information to be transmitted in the PUCCH transmission indicates a positive SR or a negative SR, wherein the first cyclic shift corresponds to one of four cyclic shifts that can be used for indicating the HARQ ACK/NACK information and the SR information when a single HARQ ACK/NACK is indicated, and the four cyclic shifts are separated by three cyclic shift values; and
   transmit the HARQ ACK/NACK information and the SR information in the first symbol of the PUCCH transmission using the first cyclic shift and the second symbol of the PUCCH transmission using the second cyclic shift.

2. The WTRU of claim 1, wherein the processor and memory are further configured to receive a PUCCH resource index in a physical downlink control channel transmission, the PUCCH resource index indicating a resource for the PUCCH transmission.

3. The WTRU of claim 2, wherein the processor and memory are further configured to determine a set of available cyclic shifts for each of the first and second cyclic shifts based on the PUCCH resource index.

4. The WTRU of claim 1, wherein the processor and memory are further configured to receive configuration information indicating a set of available cyclic shifts for each of the first and second cyclic shifts.

5. The WTRU of claim 1, wherein each of the first and second cyclic shifts are applied to a respective base sequence.

6. The WTRU of claim 1, wherein the first and second symbols correspond to consecutive orthogonal frequency division multiplexing (OFDM) symbols.

7. The WTRU of claim 2, wherein the PUCCH resource index includes a physical resource block for transmitting the HARQ ACK/NACK information.

8. The WTRU of claim 1, wherein the processor is further configured to transmit a positive scheduling request (SR) with the HARQ ACK/NACK information.

9. The WTRU of claim 1, wherein the processor is further configured to transmit a reference signal on each subcarrier of each of the first and second symbols.

10. The WTRU of claim 1, wherein a first set of cyclic shifts are available to indicate the HARQ ACK/NACK information with the positive SR and a second set of cyclic shifts are available to indicate the HARQ ACK/NACK information with the negative SR.

11. A method implemented by a wireless transmit receive unit (WTRU), the method comprising:
   determining to transmit hybrid automatic retransmission request (HARQ) acknowledgement and negative acknowledgement (ACK/NACK) information or scheduling request (SR) information in a physical uplink control channel (PUCCH) transmission;
   determining a first cyclic shift to be applied for a first symbol of the PUCCH transmission and a second cyclic shift to be applied for a second symbol of the PUCCH transmission, wherein the first and second cyclic shifts are different, and wherein the first and second cyclic shifts are determined based on the HARQ ACK/NACK information and the SR information to be transmitted in the PUCCH transmission indicates a positive SR or a negative SR, wherein the first cyclic shift corresponds to one of four cyclic shifts that can be used for indicating the HARQ ACK/NACK information and the SR information when a single HARQ ACK/NACK is indicated, and the four cyclic shifts are separated by three cyclic shift values; and
   transmitting the HARQ ACK/NACK information and the SR information in the first symbol of the PUCCH transmission using first cyclic shift and the second symbol of the PUCCH transmission using the second cyclic shift.

12. The method of claim 11, the method further comprising:
   receiving a PUCCH resource index in a physical downlink control channel transmission, the PUCCH resource index indicating a resource for the PUCCH transmission; and
   determining a set of available cyclic shifts for each of the first and second cyclic shifts are determined based on the PUCCH resource index.

13. The method of claim 11, wherein the processor is further configured to transmit a positive scheduling request (SR) with the HARQ ACK/NACK information.

14. The method of claim 11, wherein a reference signal is transmitted on each subcarrier of each of the first and second symbols.

15. The WTRU of claim 11, wherein the first and second symbols correspond to consecutive orthogonal frequency division multiplexing (OFDM) symbols.

16. The WTRU of claim 11, wherein a first set of cyclic shifts are available to indicate the HARQ ACK/NACK information with a positive SR and a second set of cyclic shifts are available to indicated the HARQ ACK/NACK information with a negative SR.

17. The method of claim 11, wherein each of the first and second cyclic shifts are applied to a respective base sequence.

18. The WTRU of claim 12, wherein the PUCCH resource index includes a physical resource block for transmitting the HARQ ACK/NACK information.

19. A base station comprising a processor and memory, the processor configured to:
   receive hybrid automatic retransmission request (HARQ) acknowledgement and negative acknowledgement (ACK/NACK) information or scheduling request (SR) information in a physical uplink control channel (PUCCH) transmission, wherein a first cyclic shift is applied for a first symbol of the PUCCH transmission and a second cyclic shift is applied for a second symbol of the PUCCH transmission, the first and second cyclic shifts are different, and wherein the first and second cyclic shifts are determined based on the HARQ ACK/NACK information and whether the SR information to be transmitted indicates a positive SR or a negative SR in the PUCCH transmission, wherein the first cyclic shift corresponds to one of four cyclic shifts that can be used for indicating the HARQ ACK/NACK information and the SR information when a single HARQ ACK/NACK is indicated, and the four cyclic shifts are separated by three cyclic shift values; and
   receive the HARQ ACK/NACK information and the SR information in the first symbol of the PUCCH transmission using first cyclic shift and the second symbol of the PUCCH transmission using the second cyclic shift.

20. The base station of claim 19, wherein the processor is further configured to receive a reference signal on each subcarrier of each of the first and second symbols.

* * * * *